United States Patent
Nonaka et al.

[11] Patent Number: 5,872,605
[45] Date of Patent: Feb. 16, 1999

[54] VIDEO SIGNAL PROCESSING APPARATUS

[75] Inventors: Tomoyuki Nonaka, Yokohama; Akifumi Tabata, Ibaraki-ken; Hiroyuki Hori, Hitachinaka; Akira Okasaka; Masahiro Sasaki, both of Takasaki; Kazuki Ito, Yokosuka, all of Japan

[73] Assignee: Victor Company of Japan, Ltd., Yokohama, Japan

[21] Appl. No.: 863,894

[22] Filed: May 28, 1997

[30] Foreign Application Priority Data

May 29, 1996 [JP] Japan .................................. 8-134050

[51] Int. Cl.⁶ ........................................ H04N 9/64
[52] U.S. Cl. .................. 348/710; 348/625; 348/630; 348/631; 348/642; 348/663; 348/914
[58] Field of Search ..................... 348/625, 630, 348/642–647, 653–654, 662, 663–679, 520, 518, 539, 549, 710; 375/229

[56] References Cited

U.S. PATENT DOCUMENTS

| | | | |
|---|---|---|---|
| 3,824,340 | 7/1974 | Sensney | 348/519 |
| 3,872,498 | 3/1975 | Pritchard | 348/609 |
| 3,999,130 | 12/1976 | Whisler | 375/229 |
| 4,222,074 | 9/1980 | Breithaupt | 348/518 |
| 4,918,528 | 4/1990 | Oohashi | 348/625 |
| 5,038,206 | 8/1991 | Ubutaka . | |
| 5,047,866 | 9/1991 | Watanabe et al. | 386/25 |
| 5,053,865 | 10/1991 | Ubukata | 348/631 |

FOREIGN PATENT DOCUMENTS 683464  10/1994  Japan .

*Primary Examiner*—Andrew I. Faile
*Assistant Examiner*—Reuben M. Brown
*Attorney, Agent, or Firm*—Pollock, Vande, Sande & Amernick

[57] ABSTRACT

A video signal processing apparatus includes an equalizer for delaying an input color signal by an adjustable phase retardation. A low pass filter is operative for delaying the input color signal by an adjustable phase retardation. A phase detector is operative for detecting a difference between a phase of an output signal of the equalizer and a phase of an output signal of the low pass filter, and outputting a signal representative of the detected phase difference. The phase retardation provided by the equalizer and the phase retardation provided by the low pass filter are adjusted in response to the output signal of the phase detector to maintain the difference between the phase of the output signal of the equalizer and the phase of the output signal of the low pass filter at a predetermined value, for example, 90 degrees.

20 Claims, 17 Drawing Sheets

VIDEO SIGNAL PROCESSING APPARATUS

BACKGROUND OF THE INVENTION

1. Field of the Invention

This invention relates to an apparatus for processing a color video signal or a color television signal.

2. Description of the Related Art

Japanese published examined patent application 6-083464 (corresponding to U.S. Pat. No. 5,038,206) discloses a picture-quality improving circuit including a chroma difference extractor. The chroma difference extractor has a cascade combination of first, second, and third equalizers. The chroma difference extractor also has first and second subtractors connected to the cascade combination of the equalizers.

In the chroma difference extractor of Japanese application 6-083464, the signal delays offered by the second and third equalizers are set smaller than the signal delay offered by the first equalizer. This setting is based on the following reason. The second and third equalizers and the second subtractor compose a device generating a signal which is used to enhance the color signal. On the other hand, the first and second equalizers and the first subtractor compose a chroma edge detector. In order to attain a high sensitivity of the chroma edge detector, the delay quantity provided by the first equalizer is set great and the signal difference is determined at points adequately distant from each other.

In the chroma difference extractor of Japanese application 6-083464, the equalizers are adjusted by an operator.

Generally, a portion of such a prior-art picture-quality improving circuit is formed as an integrated circuit chip to which an external filter block having adjustable equalizers is connected. This design allows an operator to access the filter block to adjust the equalizers. Since the filter block is not built in the integrated circuit chip, the prior-art picture-quality improving circuit tends to be large in size.

SUMMARY OF THE INVENTION

It is an object of this invention to provide an improved video signal processing apparatus.

A first aspect of this invention provides a video signal processing apparatus comprising an equalizer for delaying an input color signal by an adjustable phase retardation; a low pass filter for delaying the input color signal by an adjustable phase retardation; a phase detector for detecting a difference between a phase of an output signal of the equalizer and a phase of an output signal of the low pass filter, and outputting a signal representative of the detected phase difference; and means for adjusting the phase retardation provided by the equalizer and the phase retardation provided by the low pass filter in response to the output signal of the phase detector to maintain the difference between the phase of the output signal of the equalizer and the phase of the output signal of the low pass filter at a predetermined value.

A second aspect of this invention is based on the first aspect thereof, and provides a video signal processing apparatus wherein the low pass filter comprises a second-order low pass filter, and the predetermined value is equal to 90 degrees.

A third aspect of this invention is based on the first aspect thereof, and provides a video signal processing apparatus further comprising an amplifier for amplifying the output signal of the equalizer at a variable gain, and outputting an amplification-resultant signal to the phase detector; and means for comparing a level of the input color signal and a level of the output signal of the amplifier, and varying the gain of the amplifier in response to a result of the level comparison to compensate for a level variation caused by the equalizer.

A fourth aspect of this invention is based on the first aspect thereof, and provides a video signal processing apparatus further comprising an adjustable filter; and means for adjusting the adjustable filter in response to the output signal of the phase detector.

A fifth aspect of this invention is based on the first aspect thereof, and provides a video signal processing apparatus further comprising means for generating a burst signal representative of a burst period; and means for selectively activating and deactivating the phase detector in response to the burst signal.

A sixth aspect of this invention is based on the first aspect thereof, and provides a video signal processing apparatus further comprising means for generating a vertical sync signal representative of a vertical sync period; and means for selectively activating and deactivating the phase detector in response to the vertical sync signal.

A seventh aspect of this invention is based on the first aspect thereof, and provides a video signal processing apparatus further comprising means for adding a reference signal to the input color signal on a time-division multiplexing basis; and means for activating the phase detector when the reference signal is present in the input color signal, and deactivating the phase detector when the reference signal is absent from the input color signal.

An eighth aspect of this invention is based on the seventh aspect thereof, and provides a video signal processing apparatus further comprising means for removing a portion, corresponding to the reference signal, from the output signal of the equalizer.

A ninth aspect of this invention is based on the seventh aspect thereof, and provides a video signal processing apparatus wherein the reference signal comprises a color sub-carrier.

A tenth aspect of this invention is based on the first aspect thereof, and provides a video signal processing apparatus wherein the adjusting means comprises a first voltage-to-current converter for converting the output signal of the phase detector into a first current signal, the first voltage-to-current converter having a first conversion characteristic; a second voltage-to-current converter for converting the output signal of the phase detector into a second current signal, the second voltage-to-current converter having a second conversion characteristic different from the first conversion characteristic; a selector for selecting one out of the first current signal and the second current signal; and means for adjusting the phase retardation provided by the equalizer and the phase retardation provided by the low pass filter in response to the current signal selected by the selector.

An eleventh aspect of this invention provides a video signal processing apparatus comprising a first equalizer for delaying an input color signal by an adjustable phase retardation; a second equalizer for delaying an output signal of the first equalizer by an adjustable phase retardation; a third equalizer for delaying an output signal of the second equalizer by an adjustable phase retardation; means for generating a first color edge signal in response to the input color signal and the output signal of the second equalizer; means for generating a second color edge signal in response to the output signal of the first equalizer and an output signal of the third equalizer; means for generating a luminance edge signal; a comparator for comparing the first color edge signal and the luminance edge signal; a multiplier for multiplying the second color edge signal and an output signal of the comparator; means for combining the output signal of the second equalizer and an output signal of the multiplier into an edge-emphasized color signal; a low pass filter for delaying the input color signal by an adjustable phase retardation; a phase detector for detecting a difference between a phase of an output signal of the low pass filter and one of (1) a phase of an output signal of the second equalizer and (2) a phase of an output signal of the third equalizer, and outputting a signal representative of the detected phase difference; and means for adjusting the phase retardation provided by the first equalizer, the phase retardation provided by the second equalizer, the phase retardation provided by the third equalizer, and the phase retardation provided by the low pass filter in response to the output signal of the phase detector.

A twelfth aspect of this invention is based on the eleventh aspect thereof, and provides a video signal processing apparatus wherein the low pass filter comprises a second-order low pass filter.

A thirteenth aspect of this invention is based on the eleventh aspect thereof, and provides a video signal processing apparatus further comprising means for compensating a level variation caused by the first equalizer; means for compensating a level variation caused by the second equalizer; and means for compensating a level variation caused by the third equalizer.

A fourteenth aspect of this invention is based on the eleventh aspect thereof, and provides a video signal processing apparatus further comprising an adjustable filter; and means for adjusting the adjustable filter in response to the output signal of the phase detector.

A fifteenth aspect of this invention is based on the eleventh aspect thereof, and provides a video signal processing apparatus further comprising means for generating a burst signal representative of a burst period; and means for selectively activating and deactivating the phase detector in response to the burst signal.

A sixteenth aspect of this invention is based on the eleventh aspect thereof, and provides a video signal processing apparatus further comprising means for generating a vertical sync signal representative of a vertical sync period; and means for selectively activating and deactivating the phase detector in response to the vertical sync signal.

A seventeenth aspect of this invention is based on the eleventh aspect thereof, and provides a video signal processing apparatus further comprising means for adding a reference signal to the input color signal on a time-division multiplexing basis; and means for activating the phase detector when the reference signal is present in the input color signal, and deactivating the phase detector when the reference signal is absent from the input color signal.

An eighteenth aspect of this invention is based on the seventeenth aspect thereof, and provides a video signal processing apparatus further comprising means for removing a portion, corresponding to the reference signal, from the output signal of the second equalizer.

A nineteenth aspect of this invention is based on the seventeenth aspect thereof, and provides a video signal processing apparatus wherein the reference signal comprises a color subcarrier.

A twentieth aspect of this invention is based on the eleventh aspect thereof, and provides a video signal processing apparatus wherein the adjusting means comprises a first voltage-to-current converter for converting the output signal of the phase detector into a first current signal, the first voltage-to-current converter having a first conversion characteristic; a second voltage-to-current converter for converting the output signal of the phase detector into a second current signal, the second voltage-to-current converter having a second conversion characteristic different from the first conversion characteristic; a selector for selecting one out of the first current signal and the second current signal; and means for adjusting the phase retardation provided by the first equalizer, the phase retardation provided by the second equalizer, the phase retardation provided by the third equalizer, and the phase retardation provided by the low pass filter in response to the current signal selected by the selector.

DESCRIPTION OF THE PREFERRED EMBODIMENTS

First Embodiment

Figure 1:
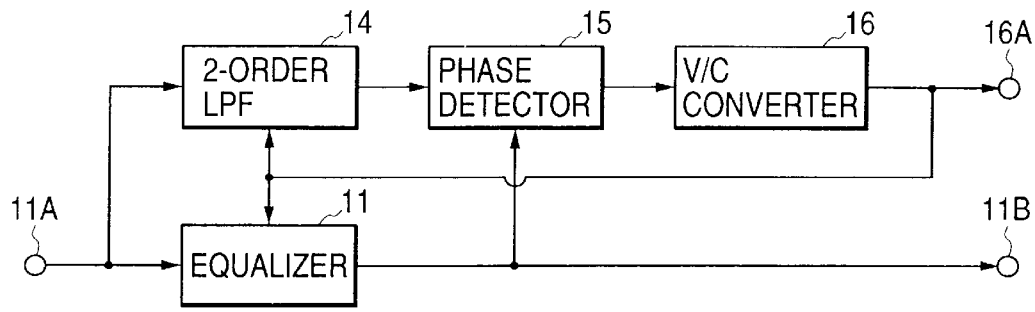
FIG. 1 is a block diagram of a video signal processing apparatus according to a first embodiment of this invention.

With reference to FIG. 1, a video signal processing apparatus has an input terminal 11A, an output terminal 11B, and an output terminal 16A. The apparatus input terminal 11A receives an input color signal which is separated from a composite vide signal by a suitable device (not shown in FIG. 1) such as a Y/C separation circuit.

The video signal processing apparatus includes a variable equalizer 11, a variable second-order low pass filter (LPF) 14, a phase detector 15, and a voltage-to-current converter (V/C converter) 16. The equalizer 11 is connected between the apparatus input terminal 11A and the apparatus output terminal 11B. The LPF 14, the phase detector 15, and the voltage-to-current converter 16 are connected in series or cascade in that order between the apparatus input terminal 11A and the apparatus output terminal 16A. The output terminal of the equalizer 11 is connected to an input side of the phase detector 15. The equalizer 11 has a control terminal connected to the output terminal of the voltage-to-current converter 16. The LPF 14 has a control terminal connected to the output terminal of the voltage-to-current converter 16.

The equalizer 11 provides a phase shift (a signal delay or a phase retardation) which depends on a current inputted via its control terminal. The equalizer 11 serves to compensate for an undesired phase-frequency characteristic of a system preceding the video signal processing apparatus. The LPF 14 provides a signal delay or a phase retardation which depends on a current inputted via its control terminal.

The equalizer 11 receives the input color signal via the apparatus input terminal 11A, and subjects the input color signal to a phase equalization process. Specifically, the equalizer 11 delays the input color signal by an adjustable phase retardation. The output color signal of the equalizer 11, that is, the equalization-resultant color signal, is fed to the apparatus output terminal 11B before being transmitted to an external device (not shown in FIG. 1).

Figure 2:
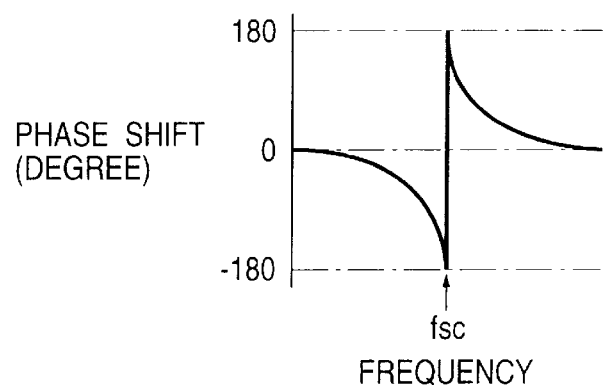
FIG. 2 is a diagram of a phase-frequency response characteristic of an equalizer in FIG. 1.

The equalizer 11 is designed to have the following phase-frequency response characteristic. Under a normal condition, as shown in FIG. 2, the phase retardation provided by the equalizer 11 is equal to 180 degrees (+180 degrees or −180 degrees) at a color subcarrier frequency fsc of the input color signal.

Figure 3:
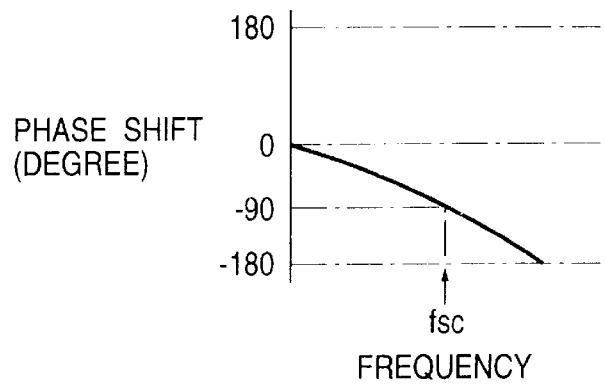
FIG. 3 is a diagram of a phase-frequency response characteristic of a second-order LPF in FIG. 1.

The LPF 14 is designed to have the following phase-frequency response characteristic. Under a normal condition, as shown in FIG. 3, the phase retardation provided by the LPF 14 is equal to 90 degrees at the color subcarrier frequency fsc of the input color signal.

The LPF 14 receives the input color signal via the apparatus input terminal 11A, and subjects the input color signal to a low-pass filtering process. During the low-pass filtering process, the LPF 14 delays the input color signal by an adjustable phase retardation. The output color signal of the LPF 14, that is, the filtering-resultant color signal, is fed to a first input terminal of the phase detector 15. On the other hand, the equalization-resultant color signal is fed from the equalizer 11 to a second input terminal of the phase detector 15.

The phase detector 15 senses the difference between the phase of the output signal of the equalizer 11 (the equalization-resultant color signal) and the phase of the output signal of the LPF 14 (the filtering-resultant color signal). The phase detector 15 generates a voltage signal which depends on the sensed phase difference. The phase detector 15 outputs the phase-difference voltage signal to the voltage-to-current converter 16.

The voltage-to-current converter 16 converts the phase-difference voltage signal to a control current signal which depends on the phase difference sensed by the phase detector 15. The voltage-to-current converter 16 outputs the control current signal to the equalizer 11 and the LPF 14 so that the phase shift provided by the equalizer 11 and the phase retardation provided by the LPF 14 will be adjusted in response to the control current signal. The phase adjustment responsive to the control current signal is designed to maintain the phase difference between the output signal of the equalizer 11 (the equalization-resultant color signal) and the output signal of the LPF 14 (the filtering-resultant color signal) at 90 degrees. Thus, the equalizer 11 is automatically adjusted.

For example, the directions of control of the phase retardations provided by the equalizer 11 and the LPF 14 are chosen as follows. If the phase difference between the output signal of the equalizer 11 and the output signal of the LPF 14 is greater than 90 degrees, the phase retardation provided by the equalizer 11 is decreased while the phase retardation provided by the LPF 14 is increased. If the phase difference between the output signal of the equalizer 11 and the output signal of the LPF 14 is smaller than 90 degrees, the phase retardation provided by the equalizer 11 is increased while the phase retardation provided by the LPF 14 is decreased.

It should be noted that only the phase shift provided by the equalizer 11 may be adjusted in response to the control current signal. In this case, the LPF 14 is of a fixed type.

The output signal of the voltage-to-current converter 16, that is, the control current signal, is fed to the apparatus output terminal 16A before being transmitted to an external device (not shown in FIG. 1).

Figure 26:
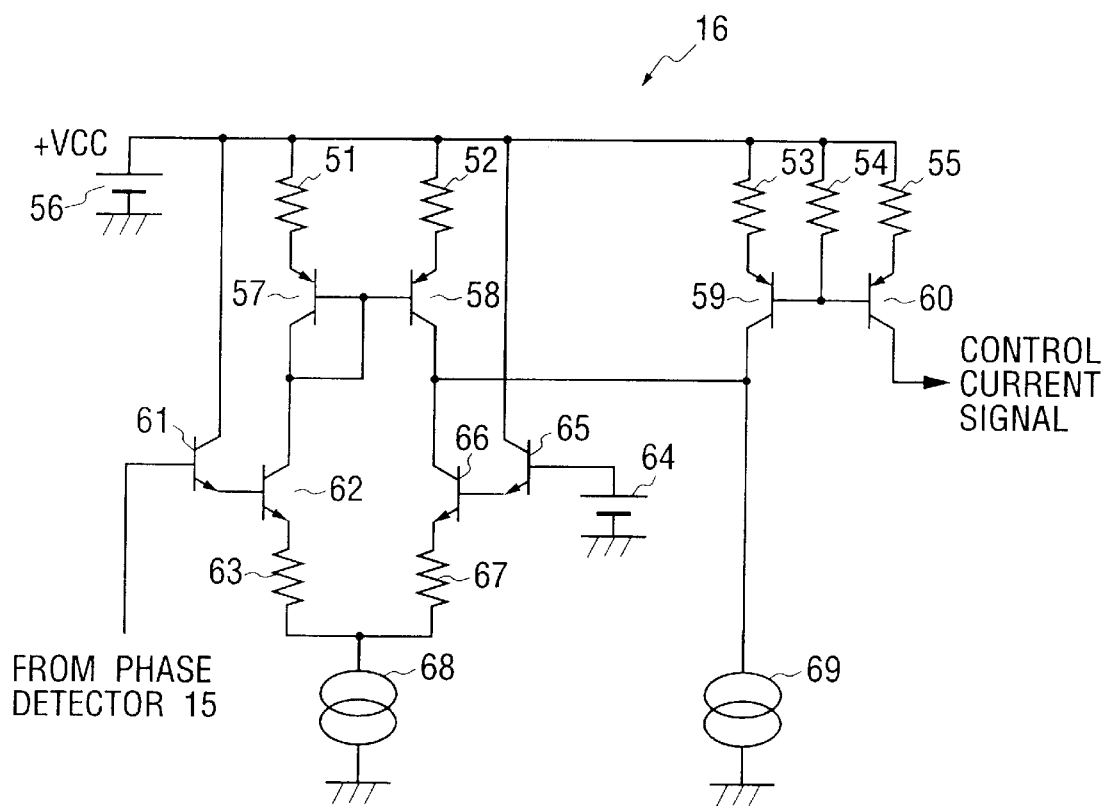
FIG. 26 is a schematic diagram of a voltage-to-current converter in FIG. 1.

As shown in FIG. 26, the voltage-to-current converter 16 includes fixed resistors 51, 52, 53, 54, 55, 63, and 67, PNP transistors 57, 58, 59, and 60, NPN transistors 61, 62, 65, and 66, a dc power supply 56, a reference dc voltage source 64, a constant current source 68, and a reference current source 69.

The base of the transistor 61 is connected to the output terminal of the phase detector 15 (see FIG. 1). The collector of the transistor 61 is connected to the positive terminal of the power supply 56. The negative terminal of the power supply 56 is grounded. The emitter of the transistor 57 is connected via the resistor 51 to the positive terminal of the power supply 56. The emitter of the transistor 58 is connected via the resistor 52 to the positive terminal of the power supply 56. The bases of the transistors 57 and 58 are connected to each other. The collector of the transistor 57 is connected to the bases of the transistors 57 and 58. The collector of the transistor 57 is connected to the collector of the transistor 62. The base of the transistor 62 is connected to the emitter of the transistor 61. The emitter of the transistor 62 is connected to a first end of the constant current source 68 via the resistor 63. A second end of the constant current source 68 is grounded.

The base of the transistor 65 is connected to the positive terminal of the reference voltage source 64. The negative terminal of the reference voltage source 64 is grounded. The collector of the transistor 65 is connected to the positive terminal of the power supply 56. The emitter of the transistor 65 is connected to the base of the transistor 66. The collectors of the transistors 58 and 66 are connected to each other. The emitter of the transistor 66 is connected to the first end of the constant current source 68 via the resistor 67.

The emitter of the transistor 59 is connected via the resistor 53 to the positive terminal of the power supply 56. The emitter of the transistor 60 is connected via the resistor 55 to the positive terminal of the power supply 56. The bases of the transistors 59 and 60 are connected to each other. The bases of the transistors 59 and 60 are connected via the resistor 54 to the positive terminal of the power supply 56. The collector of the transistor 59 is connected to a first end of the reference current source 69. A second end of the reference current source 69 is grounded. The collectors of the transistors 58 and 66 are connected to the junction between the collector of the transistor 59 and the first end of the reference current source 69. A control current signal appears at the collector of the transistor 60. The control current signal is transmitted from the collector of the transistor 60 to the equalizer 11 (see FIG. 1) and the apparatus output terminal 16A.

The power supply 56 provides a constant power supply voltage Vcc. The transistors 57 and 58 compose a current mirror. The transistors 61 and 62 are connected in a Darlington circuit. The transistors 65 and 66 are connected in a Darlington circuit. The transistors 59 and 60 compose a current mirror.

Preferably, the voltage-to-current converter 16 of FIG. 26 is designed so that the difference between the phase of the output signal of the equalizer 11 and the phase of the output signal of the LPF 14 can vary in the range of 90±90 degrees, that is, the range of 0 degree to 180 degrees.

It is preferable to make the video signal processing apparatus of FIG. 1 into a single integrated circuit chip.

Second Embodiment

Figure 4:
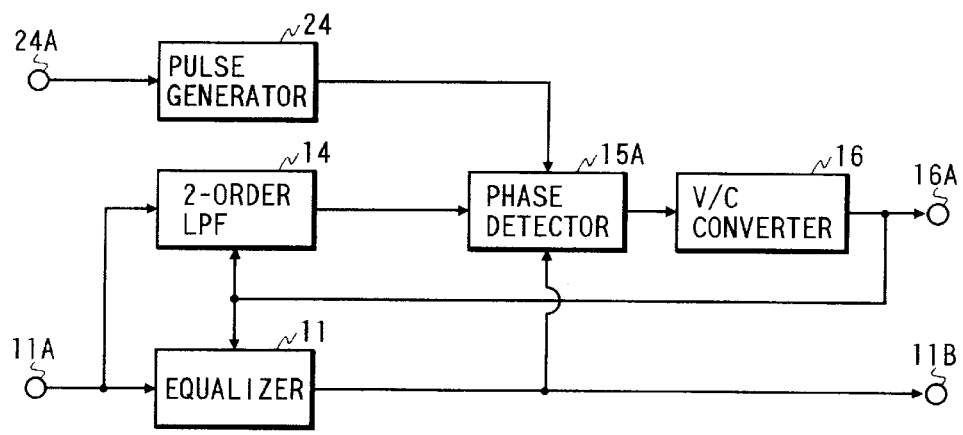
FIG. 4 is a block diagram of a video signal processing apparatus according to a second embodiment of this invention.

FIG. 4 shows a second embodiment of this invention which is similar to the embodiment of FIG. 1 except for an additional arrangement indicated hereinafter.

The embodiment of FIG. 4 includes a phase detector 15A instead of the phase detector 15 in FIG. 1. The embodiment of FIG. 4 also includes a pulse generator 24 connected between an apparatus input terminal 24A and the phase detector 15A. The pulse generator 24 receives a composite sync signal via the apparatus input terminal 24A. The composite sync signal is separated from a composite video signal by a suitable device (not shown). The pulse generator 24 responds to the composite sync signal, and periodically generates a gate pulse at a timing which corresponds to a burst period of the composite video signal. The pulse generator 24 periodically outputs the gate pulse to the phase detector 15A.

The phase detector 15A is selectively enabled and disabled in response to the gate pulses fed from the pulse generator 24. Specifically, during every burst period, the phase detector 15A remains enabled. During other periods, the phase detector 15A remains disabled or suspended.

Accordingly, it is possible to prevent an equalizer 11 and a second-order LPF 14 from being adversely affected by offset components in the output signal of the phase detector 15A which might occur during periods other than burst periods.

It is preferable to provide a voltage-to-current converter 16 with a circuit for averaging a control current signal in time base before the control current signal is outputted therefrom.

Third Embodiment

Figure 5:
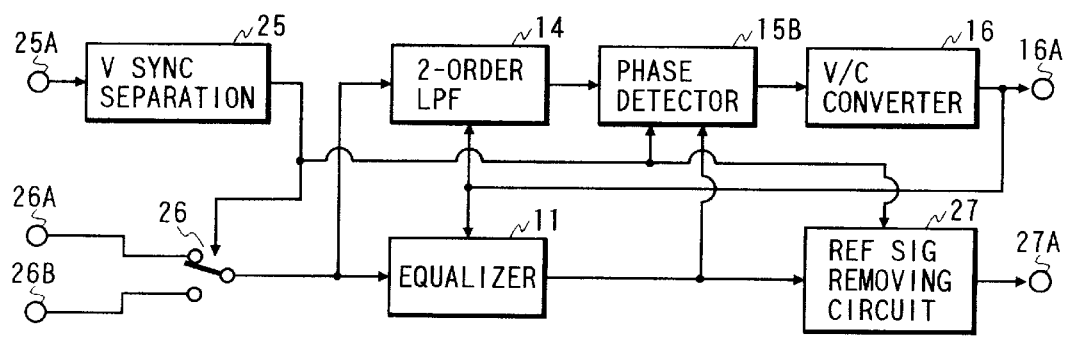
FIG. 5 is a block diagram of a video signal processing apparatus according to a third embodiment of this invention.

FIG. 5 shows a third embodiment of this invention which is similar to the embodiment of FIG. 1 except for an additional arrangement indicated hereinafter.

The embodiment of FIG. 5 includes a phase detector 15B instead of the phase detector 15 in FIG. 1. The embodiment of FIG. 5 also includes a vertical sync separation circuit 25, a switch 26, and a reference-signal removing circuit 27.

An apparatus input terminal 25A is followed by the vertical sync separation circuit 25. The output terminal of the vertical sync separation circuit 25 is connected to a control terminal of the phase detector 15B, a control terminal of the switch 26, and a control terminal of the reference-signal removing circuit 27. The switch 26 has first and second fixed contacts, and a movable contact. The movable contact of the switch 26 is connected to either the first fixed contact or the second fixed contact thereof in response to a signal inputted via its control terminal. The first and second fixed contacts of the switch 26 follow first and second apparatus input terminals 26A and 26B respectively. The movable contact of the switch 26 is followed by an equalizer 11 and a second-order LPF 14. The reference-signal removing circuit 27 is connected between an output side of the equalizer 11 and an apparatus output terminal 27A.

The vertical sync separation circuit 25 receives a composite sync signal via the apparatus input terminal 25A. The composite sync signal is separated from a composite video signal by a suitable device (not shown). The vertical sync separation circuit 25 separates a vertical sync signal from the composite sync signal. The vertical sync separation circuit 25 outputs the vertical sync signal to the phase detector 15B, the switch 26, and the reference-signal removing circuit 27 as a control signal.

The apparatus input terminal 26A receives an input color signal which is separated from the composite vide signal by a suitable device (not shown in FIG. 5) such as a Y/C separation circuit. The input color signal travels from the apparatus input terminal 26A to the switch 26. The apparatus input terminal 26B receives a reference signal, for example, a color subcarrier, which is separated from the composite vide signal by a suitable device (not shown). The reference signal travels from the apparatus input terminal 26B to the switch 26.

The switch 26 selects one out of the input color signal and the reference signal in response to the vertical sync signal, and transmits the selected signal to the equalizer 11 and the LPF 14. Specifically, the switch 26 selects the reference signal during every vertical sync period. The switch 26 selects the color signal during other periods.

The phase detector 15B is selectively enabled and disabled in response to the vertical sync signal. Specifically, during every vertical sync period, the phase detector 15B remains enabled. During other periods, the phase detector 15B remains disabled or suspended.

The reference-signal removing circuit 27 receives an equalization-resultant color signal from the equalizer 11. The reference-signal removing circuit 27 selectively transmits the equalization-resultant color signal to the apparatus output terminal 27A in response to the vertical sync signal. Specifically, during every vertical sync period, the reference-signal removing circuit 27 blocks the travel of the equalization-resultant color signal toward the apparatus output terminal 27A. During other periods, the reference-signal removing circuit 27 conducts the equalization-resultant color signal to the apparatus output terminal 27A. Accordingly, the reference signal is removed from the equalization-resultant color signal. The reference-signal removing circuit 27 includes, for example, a switch.

It is possible to prevent the equalizer 11 and the LPF 14 from being adversely affected by offset components in the output signal of the phase detector 15A which might occur during periods other than vertical sync periods. Furthermore, it is possible to prevent the equalizer 11 and the LPF 14 from being adversely affected by the input color signal.

It is preferable to provide a voltage-to-current converter 16 with a circuit for averaging a control current signal in time base before the control current signal is outputted therefrom.

Fourth Embodiment

Figure 6:
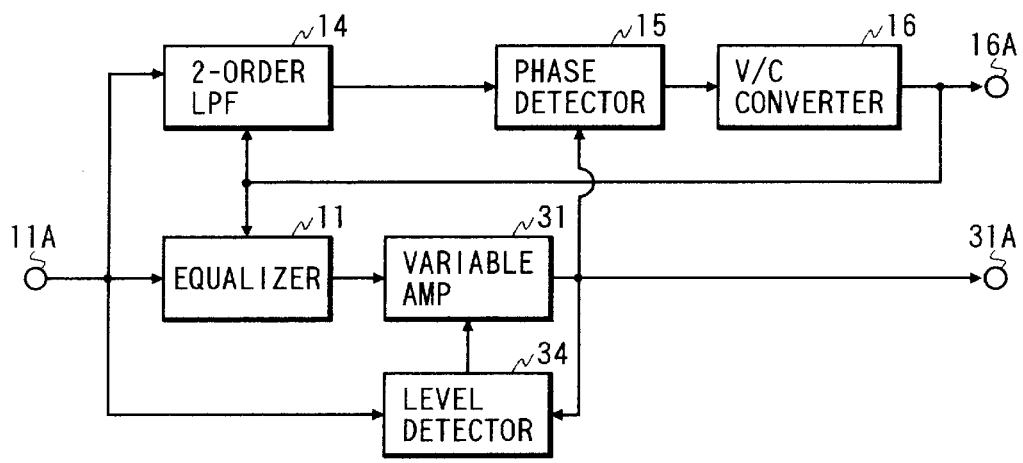
FIG. 6 is a block diagram of a video signal processing apparatus according to a fourth embodiment of this invention.

FIG. 6 shows a fourth embodiment of this invention which is similar to the embodiment of FIG. 1 except for an additional arrangement indicated hereinafter.

The embodiment of FIG. 6 includes a variable-gain amplifier 31 and a level detector 34. An input side of the variable-gain amplifier 31 is connected to an output side of an equalizer 11. An output side of the variable-gain amplifier 31 is connected to an input side of a phase detector 15 and an apparatus output terminal 31A. The output side of the variable-gain amplifier 31 is also connected to a first input side of the level detector 34. A second input side of the level detector 34 follows an apparatus input terminal 11A. An output side of the level detector 34 is connected to a control terminal of the variable-gain amplifier 31.

The variable-gain amplifier 31 receives an equalization-resultant color signal from the equalizer 11, and amplifies the equalization-resultant color signal at a variable gain. The variable-gain amplifier 31 outputs an amplification-resultant signal to the phase detector 15 and the apparatus output terminal 31A.

The level detector 34 receives an input color signal via the apparatus input terminal 11A. The level detector 34 receives the output signal of the variable-gain amplifier 31. The level detector 34 includes a level comparator or a level-difference detector. The level detector 34 compares the level of the input color signal and the level of the output signal of the variable-gain amplifier 31, and generates a control signal depending on the result of the level comparison. The level detector 34 outputs the control signal to the variable-gain amplifier 31. The gain of the variable-gain amplifier 31 is adjusted in response to the control signal. The gain control of the variable-gain amplifier 31 is designed so that the level of the output signal of the variable-gain amplifier 31 will be equal to the level of the input color signal.

Accordingly, it is possible to compensate for a signal level variation caused by the equalizer 11.

Figure 20:
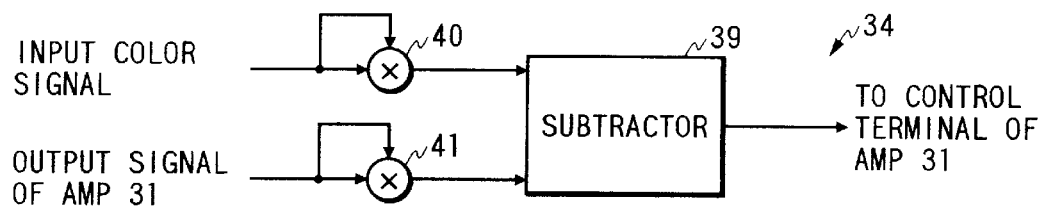
FIG. 20 is a block diagram of a phase detector in FIG. 1.

As shown in FIG. 20, the level detector 34 includes a subtractor 39 and multipliers 40 and 41. First and second input terminals of the multiplier 40 are subjected to the input color signal. The output terminal of the multiplier 40 is connected to a first input terminal of the subtractor 39. First and second input terminals of the multiplier 41 are subjected to the output signal of the variable-gain amplifier 31. The output terminal of the multiplier 41 is connected to a second input terminal of the subtractor 39.

The multiplier 40 squares the input color signal. The multiplier 40 outputs the squaring-resultant signal to the subtractor 39. The multiplier 41 squares the output signal of the variable-gain amplifier 31. The multiplier 41 outputs the squaring-resultant signal to the subtractor 39. The subtractor 39 provides a difference between the level of the output signal of the multiplier 40 and the level of the output signal of the multiplier 41. The subtractor 39 generates a control signal representing the level difference. The subtractor 39 outputs the control signal to the variable-gain amplifier 31.

Fifth Embodiment

Figure 7:
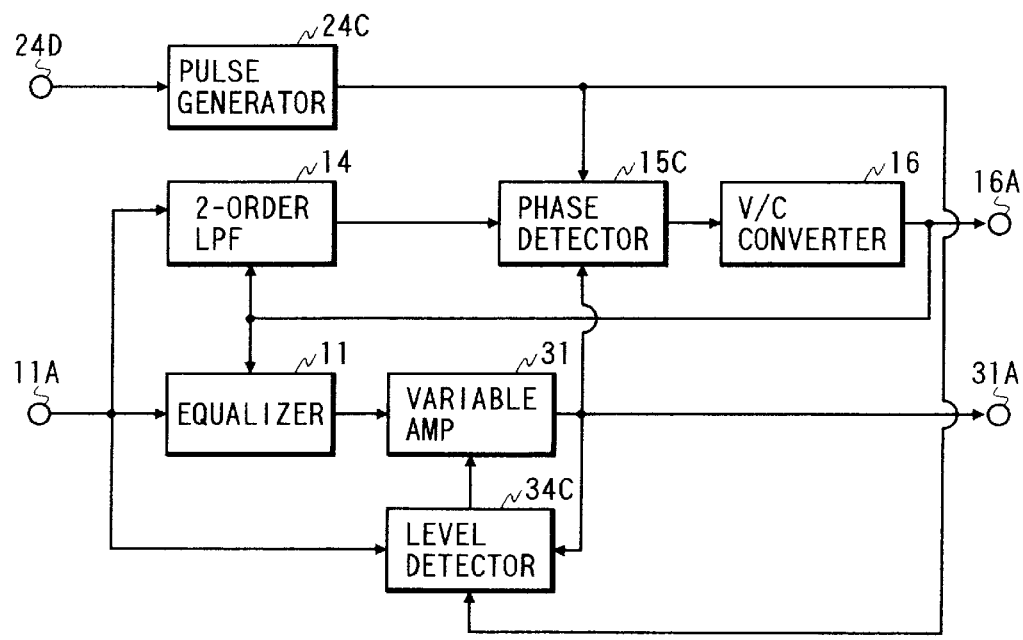
FIG. 7 is a block diagram of a video signal processing apparatus according to a fifth embodiment of this invention.

FIG. 7 shows a fifth embodiment of this invention which is similar to the embodiment of FIG. 6 except for an additional arrangement indicated hereinafter.

The embodiment of FIG. 7 includes a phase detector 15C instead of the phase detector 15 in FIG. 6. Also, the embodiment of FIG. 7 includes a level detector 34C instead of the level detector 34 in FIG. 6. Basically, the level detector 34C is similar in structure to the level detector 34 in FIG. 20. Furthermore, the embodiment of FIG. 7 includes a pulse generator 24C.

An input side of the pulse generator 24C follows an apparatus input terminal 24D. An output side of the pulse generator 24C is connected to a control terminal of the phase detector 15C and a control terminal of the level detector 34C.

The pulse generator 24C receives a composite sync signal via the apparatus input terminal 24D. The composite sync signal is separated from a composite video signal by a suitable device (not shown). The pulse generator 24C responds to the composite sync signal, and periodically generates a gate pulse at a timing which corresponds to a burst period of the composite video signal. The pulse generator 24C periodically outputs the gate pulse to the phase detector 15C and the level detector 34C.

The phase detector 15C is selectively enabled and disabled in response to the gate pulses fed from the pulse generator 24C. Specifically, during every burst period, the phase detector 15C remains enabled. During other periods, the phase detector 15C remains disabled or suspended.

The level detector 34C is selectively enabled and disabled in response to the gate pulses fed from the pulse generator 24C. Specifically, during every burst period, the level detector 34C remains enabled. During other periods, the level detector 34C remains disabled or suspended.

Accordingly, it is possible to prevent an equalizer 11 and a second-order LPF 14 from being adversely affected by offset components in the output signal of the phase detector 15C which might occur during periods other than burst periods.

It is preferable to provide a voltage-to-current converter 16 with a circuit for averaging a control current signal in time base before the control current signal is outputted therefrom.

It is preferable to provide the level detector 34C with a circuit for averaging a control signal in time base before the control signal is outputted therefrom.

Sixth Embodiment

Figure 8:
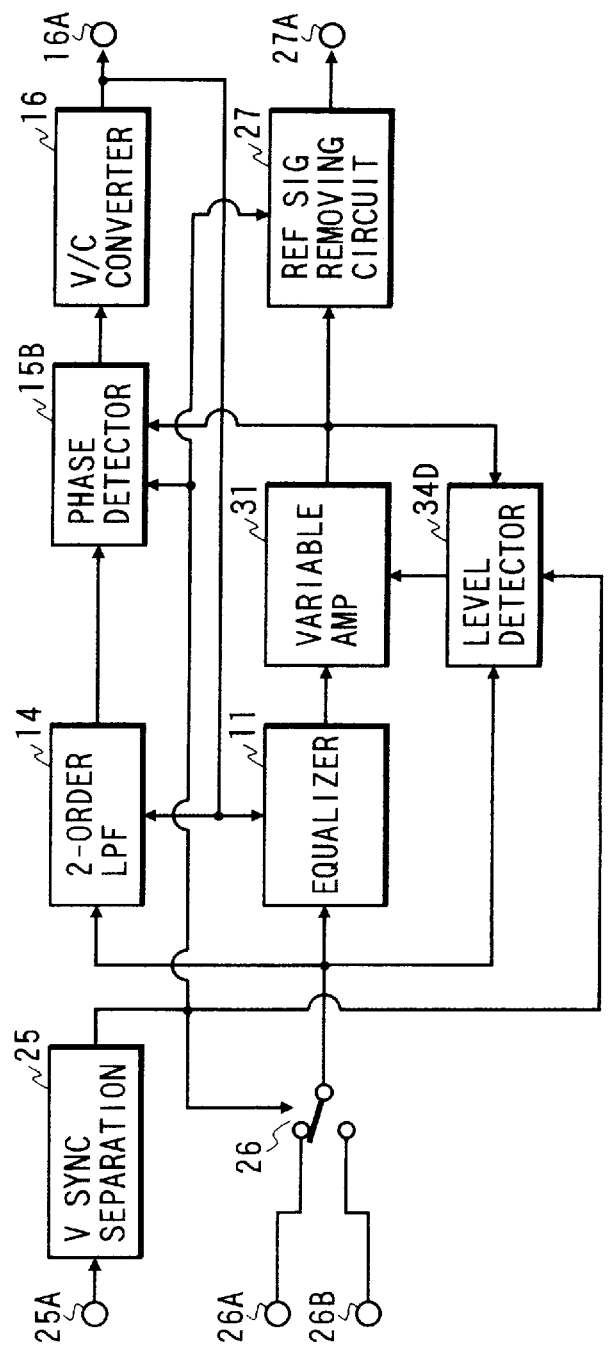
FIG. 8 is a block diagram of a video signal processing apparatus according to a sixth embodiment of this invention.

FIG. 8 shows a sixth embodiment of this invention which is similar to the embodiment of FIG. 5 except for an additional arrangement indicated hereinafter.

The embodiment of FIG. 8 includes a variable-gain amplifier 31 and a level detector 34D. Basically, the level detector 34D is similar in structure to the level detector 34 in FIG. 20. An input side of the variable-gain amplifier 31 is connected to an output side of an equalizer 11. An output side of the variable-gain amplifier 31 is connected to an input side of a phase detector 15B and an input side of a reference-signal removing circuit 27. The output side of the variable-gain amplifier 31 is also connected to a first input side of the level detector 34D. A second input side of the level detector 34D follows a movable contact of a switch 26. A control terminal of the level detector 34D is connected to an output side of a vertical sync separation circuit 25.

The variable-gain amplifier 31 receives an equalization-resultant color signal from the equalizer 11, and amplifies the equalization-resultant color signal at a variable gain. The variable-gain amplifier 31 outputs an amplification-resultant signal to the phase detector 15B and the reference-signal removing circuit 27.

The level detector 34D is selectively enabled and disabled in response to a vertical sync signal fed from the vertical sync separation circuit 25. Specifically, during every vertical sync period, the level detector 34D remains enabled. During other periods, the level detector 34D remains disabled or suspended.

During every vertical sync period, the level detector 34D receives a reference signal from the switch 26. Simultaneously, the level detector 34D receives the output signal of the variable-gain amplifier 31. The level detector 34D compares the level of the reference signal and the level of the output signal of the variable-gain amplifier 31, and generates a control signal depending on the result of the level comparison. The level detector 34D outputs the control signal to the variable-gain amplifier 31. The gain of the variable-gain amplifier 31 is adjusted in response to the control signal. The gain control of the variable-gain amplifier 31 is designed so that the level of the output signal of the variable-gain amplifier 31 will be equal to the level of the reference signal.

Accordingly, it is possible to compensate for a signal level variation caused by the equalizer 11.

It is preferable to provide the level detector 34C with a circuit for averaging the control signal in time base before the control signal is outputted therefrom.

Seventh Embodiment

Figure 9:
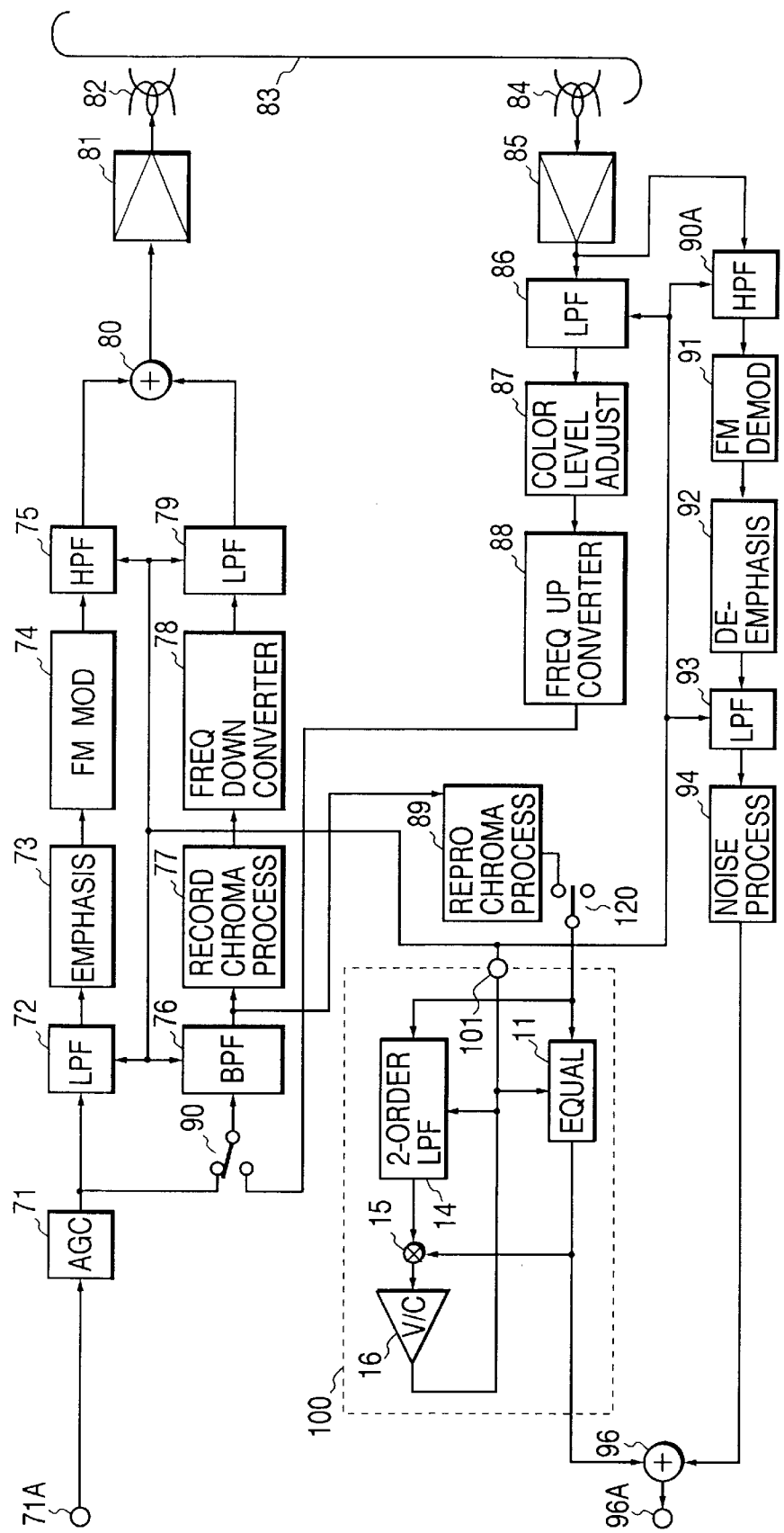
FIG. 9 is a block diagram of a magnetic recording and reproducing system including a video signal processing apparatus according to a seventh embodiment of this invention.

With reference to FIG. 9, a magnetic recording and reproducing system has a recording side and a reproducing side.

The recording side of the system includes an AGC circuit 71, an adjustable LPF (low pass filter) 72, an emphasis circuit 73, an FM modulator 74, an adjustable HPF (high pass filter) 75, an adjustable BPF (band pass filter) 76, a recording chroma processor 77, a frequency down converter 78, an adjustable LPF 79, an adder 80, a recording amplifier 81, and a magnetic head 82.

A system input terminal 71A leads to an input side of the AGC circuit 71. The AGC circuit 71 is successively followed by the LPF 72, the emphasis circuit 73, the FM modulator 74, and the HPF 75. A switch 90 has first and second fixed contacts, and a movable contact. The movable contact of the switch 90 is selectively connected to either the first fixed contact or the second fixed contact thereof. The output side of the AGC circuit 71 leads to the first fixed contact of the switch 90. The movable contact of the switch 90 leads to an input side of the BPF 76. The BPF 76 is successively followed by the recording chroma processor 77, the frequency down converter 78, and the LPF 79.

The output terminal of the HPF 75 is connected to a first input terminal of the adder 80. The output terminal of the LPF 79 is connected to a second input terminal of the adder 80. The output terminal of the adder 80 is connected via the recording amplifier 81 to the magnetic head 82. The magnetic head 82 is designed to scan a magnetic tape 83.

The reproducing side of the system includes a magnetic head 84, a reproducing amplifier 85, an adjustable LPF 86, an automatic color level adjuster 87, a frequency up converter 88, a reproducing chroma processor 89, a video signal processing apparatus 100, an adjustable HPF 90A, an FM demodulator 91, a deemphasis circuit 92, an adjustable LPF 93, a noise processor 94, and an adder 96.

The magnetic head 84 is designed to scan the magnetic tape 83. The magnetic head 84 leads to the input terminal of the reproducing amplifier 85. The output terminal of the reproducing amplifier 85 is connected to the input terminals of the LPF 86 and the HPF 90A.

The LPF 86 is successively followed by the automatic color level adjuster 87 and the frequency up converter 88. The output terminal of the frequency up converter 88 leads to the second fixed contact of the switch 90. The input side of the reproducing chroma processor 89 is connected to the output side of the BPF 76. A switch 120 has first and second fixed contacts, and a movable contact. The movable contact of the switch 120 is selectively connected to either the first fixed contact or the second fixed contact thereof. The output side of the reproducing chroma processor 89 leads to the first fixed contact of the switch 120. The movable contact of the switch 120 leads to an input terminal of the video signal processing apparatus 100. The video signal processing apparatus 100 has a main output terminal and an auxiliary output terminal 101. The main output terminal of the video signal processing apparatus 100 is connected to a first input terminal of the adder 96.

The HPF 90A is successively followed by the FM demodulator 91, the deemphasis circuit 92, the LPF 93, and the noise processor 94. The output side of the noise processor 94 is connected to a second input terminal of the adder 96. The output terminal of the adder 96 leads to a system output terminal 96A.

The auxiliary output terminal 101 of the video signal processing apparatus 100 is connected to a control terminal of the LPF 72, a control terminal of the HPF 75, a control terminal of the BPF 76, a control terminal of the LPF 79, a control terminal of the LPF 86, a control terminal of the HPF 90A, and a control terminal of the LPF 93.

The video signal processing apparatus 100 is equal in structure to the video signal processing apparatus of FIG. 1. In the video signal processing apparatus 100, the output terminal of a voltage-to-current converter 16 leads to the auxiliary apparatus output terminal 101.

Operation of the system of FIG. 9 can be changed between a recording mode and a playback mode. During the recording mode of operation, the switch 90 connects the BPF 76 to the AGC circuit 71 and disconnects the BPF 76 from the frequency up converter 88. In addition, the switch 120 disconnects the video signal processing apparatus 100 from the reproducing chroma processor 89. During the playback mode of operation, the switch 90 connects the BPF 76 to the frequency up converter 88 and disconnects the BPF 76 from the AGC circuit 71. In addition, the switch 120 connects the video signal processing apparatus 100 to the reproducing chroma processor 89.

Operation of the system of FIG. 9 will be explained in detail. During the recording mode of operation, a composite video signal is inputted into the AGC circuit 71 via the system input terminal 71A. The AGC circuit 71 removes a level variation from the composite video signal. The AGC circuit 71 outputs the resultant composite video signal to the LPF 72. Also, the AGC circuit 71 outputs the resultant composite video signal to the BPF 76 via the switch 90.

During the recording mode of operation, the LPF 72 separates a luminance signal from the composite video signal. The LPF 72 outputs the luminance signal to the emphasis circuit 73. The emphasis circuit 73 emphasizes high-frequency components of the luminance signal. The emphasis circuit 73 outputs the resultant luminance signal to the FM modulator 74. The FM modulator 74 implements frequency modulation responsive to the luminance signal, thereby converting the luminance signal into an FM luminance signal. The FM modulator 74 outputs the FM luminance signal to the HPF 75. The HPF 75 removes low-frequency components from the FM luminance signal. The HPF 75 outputs the resultant FM luminance signal to the adder 80.

During the recording mode of operation, the BPF 76 separates a color signal from the composite video signal. The BPF 76 outputs the color signal to the recording chroma processor 77. The recording chroma processor 77 removes a level variation from the color signal, and subjects the color signal to predetermined chroma processing. The recording chroma processor 77 outputs the resultant color signal to the frequency down converter 78. The frequency down converter 78 subjects the color signal to frequency down conversion, and thereby changes the color signal into a down-converted color signal. The frequency down converter 78 outputs the down-converted color signal to the LPF 79. The LPF 79 removes high-frequency components of the down-converted color signal. The LPF 79 outputs the resultant down-converted color signal to the adder 80.

The adder 80 multiplexes the FM luminance signal and the down-converted color signal into a composite signal on a frequency division basis. The adder 80 outputs the composite signal to the recording amplifier 81. The recording amplifier 81 enlarges the composite signal. The recording amplifier 81 outputs the resultant composite signal to the magnetic head 82. The magnetic head 82 records the composite signal on the magnetic tape 83.

During the recording mode of operation, a reference signal such as a color subcarrier is inputted into the video signal processing apparatus 100 via the switch 120. Specifically, the reference signal is applied to an equalizer 11 and a second-order LPF 14 within the video signal processing apparatus 100. The output signal of a voltage-to-current converter 16 within the video signal processing apparatus 100 is fed via the auxiliary output terminal 101 to the LPF 72, the HPF 75, the BPF 76, and the LPF 79. Thus, the LPF 72, the HPF 75, the BPF 76, and the LPF 79 are automatically adjusted in response to the output signal of the voltage-to-current converter 16 within the video signal processing apparatus 100.

During the playback mode of operation, the magnetic head 84 scans the magnetic tape 83, and reproduces a composite signal therefrom. The magnetic head 84 outputs the reproduced signal to the reproducing amplifier 85. The reproducing amplifier 85 enlarges the reproduced signal. The reproducing amplifier 85 outputs the resultant reproduced signal to the LPF 86 and the HPF 90A.

During the playback mode of operation, the HPF 90A separates an FM luminance signal from the reproduced signal. The HPF 90A outputs the FM luminance signal to the FM demodulator 91. The FM demodulator 91 demodulates the FM luminance signal into a baseband luminance signal. The FM demodulator 91 outputs the baseband luminance signal to the deemphasis circuit 92. The deemphasis circuit 92 subjects the baseband luminance signal to a deemphasis process inverse with respect to the emphasis process provided by the emphasis circuit 73. The deemphasis circuit 92 outputs the resultant luminance signal to the LPF 93. The LPF 93 removes high-frequency components from the luminance signal. The LPF 93 outputs the resultant luminance signal to the noise processor 94. The noise processor 94 removes noise components from the luminance signal. The noise processor 94 outputs the resultant luminance signal to the adder 96 as a reproduced luminance signal.

During the playback mode of operation, the LPF 86 separates a down-converted color signal from the reproduced signal. The LPF 86 outputs the down-converted color signal to the automatic color level adjuster 87. The automatic color level adjuster 87 removes a level variation from the down-converted color signal. The automatic color level adjuster 87 outputs the resultant down-converted color signal to the frequency up converter 88. The frequency up converter 88 subjects the down-converted color signal to frequency up conversion, and thereby changes the down-converted color signal into a reproduced color signal. The frequency up converter 88 outputs the reproduced color signal to the BPF 76 via the switch 90. The BPF 76 removes components from the reproduced color signal which have frequencies outside a predetermined band (a desired band). The BPF 76 outputs the resultant reproduced color signal to the reproducing chroma processor 89. The reproducing chroma processor 89 subjects the reproduced color signal to predetermined chroma processing. The reproducing chroma processor 89 outputs the resultant reproduced color signal to the video signal processing apparatus 100 via the switch 120. Specifically, the reproducing chroma processor 89 outputs the reproduced color signal to the equalizer 11 and the LPF 14 within the video signal processing apparatus 100. The video signal processing apparatus 100 delays the reproduced color signal. The video signal processing apparatus 100 outputs the resultant reproduced color signal to the adder 96. Specifically, the equalizer 11 within the video signal processing apparatus 100 outputs the reproduced color signal to the adder 96. The adder 96 combines the reproduced luminance signal and the reproduced color signal into a reproduced composite video signal. The adder 96 feeds the reproduced composite video signal to the system output terminal 96A.

During the playback mode of operation, the output signal of the voltage-to-current converter 16 within the video signal processing apparatus 100 is fed via the auxiliary output terminal 101 to the LPF 86, the HPF 90A, and the LPF 93. Thus, the LPF 86, the HPF 90A, and the LPF 93 are automatically adjusted in response to the output signal of the voltage-to-current converter 16 within the video signal processing apparatus 100.

It should be noted that the video signal processing apparatus 100 may be replaced by the video signal processing apparatus of FIG. 4, the video signal processing apparatus of FIG. 5, the video signal processing apparatus of FIG. 6, the video signal processing apparatus of FIG. 7, or the video signal processing apparatus of FIG. 8.

Eighth Embodiment

Figure 10:
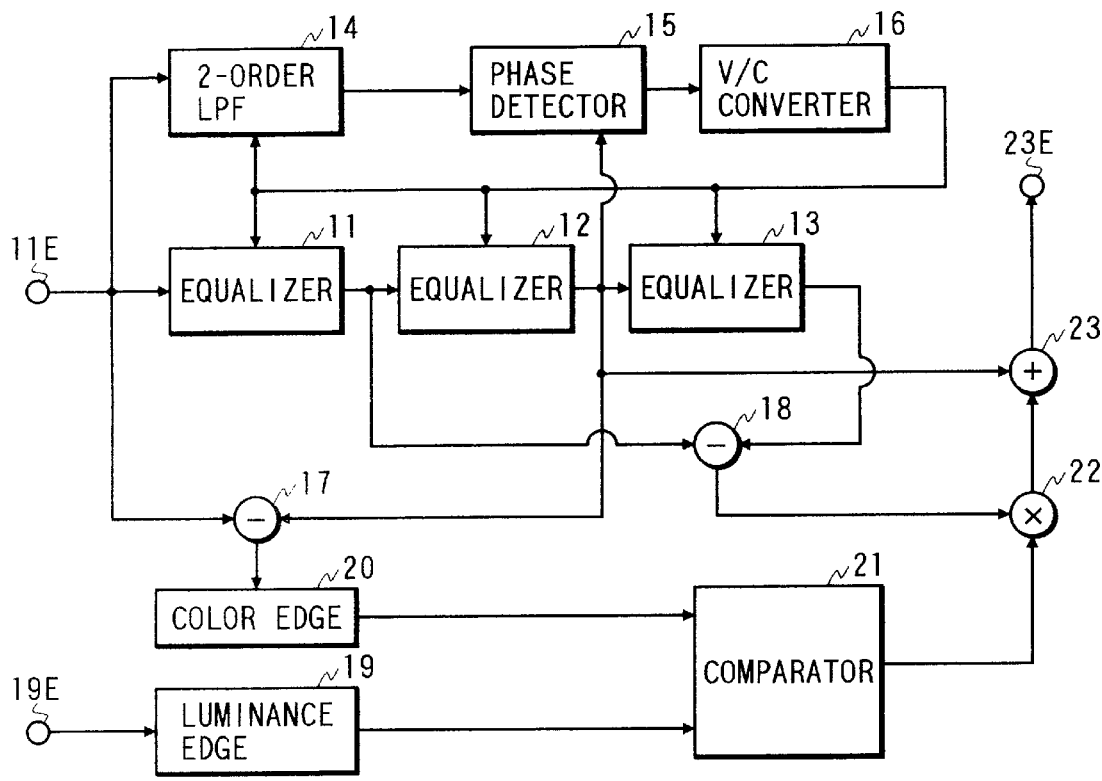
FIG. 10 is a block diagram of a video signal processing apparatus according to an eighth embodiment of this invention.

With reference to FIG. 10, a video signal processing apparatus which serves as a picture-quality improving apparatus has an input terminal 11E, an input terminal 19E, and an output terminal 23E. The apparatus input terminal 11E receives an input color signal which is separated from a composite vide signal by a suitable device (not shown in FIG. 10) such as a Y/C separation circuit. The apparatus input terminal 11E receives an input luminance signal which is separated from the composite video signal by a suitable device (not shown) such as a Y/C separation circuit.

The video signal processing apparatus includes variable equalizers 11, 12, and 13, a variable second-order low pass filter (LPF) 14, a phase detector 15, a voltage-to-current converter 16, subtractors 17 and 18, a luminance edge signal generator 19, a color edge signal generator 20, a comparator 21, a multiplier 22, and an adder 23. The voltage-to-current converter 16 is designed as shown in FIG. 26.

Here, "edge" means a contour line or a boundary between different picture regions.

The apparatus input terminal 11E leads to an input side of the equalizer 11, an input side of the LPF 14, and a first input terminal of the subtractor 17. An output side of the equalizer 11 is connected to an input side of the equalizer 12 and a first input terminal of the subtractor 18. An output side of the equalizer 12 is connected to an input side of the equalizer 13, a first input terminal of the phase detector 15, a second input terminal of the subtractor 17, and a first input terminal of the adder 23. An output side of the equalizer 13 is connected to a second input terminal of the subtractor 18. An output side of the LPF 14 is connected to a second input terminal of the phase detector 15. An output side of the phase detector 15 is connected to an input side of the voltage-to-current converter 16. The equalizers 11, 12, and 13, and the LPF 14 have control terminals respectively which are connected in common to an output side of the voltage-to-current converter 16. An output terminal of the subtractor 17 is connected to an input side of the color edge signal generator 20. An output side of the color edge signal generator 20 is connected to a first input terminal of the comparator 21. The apparatus input terminal 19E leads to an input side of the luminance edge signal generator 19. An output side of the luminance edge signal generator 19 is connected to a second input terminal of the comparator 21. An output terminal of the subtractor 18 is connected to a first input terminal of the multiplier 22. An output terminal of the comparator 21 is connected to a second input terminal of the multiplier 22. An output terminal of the multiplier 22 is connected to a second input terminal of the adder 23. An output terminal of the adder 23 leads to the apparatus output terminal 23E.

The equalizer 11 provides a phase shift (a signal delay or a phase retardation) which depends on a current inputted via its control terminal. The equalizer 12 provides a phase shift (a signal delay or a phase retardation) which depends on a current inputted via its control terminal. The equalizer 13 provides a phase shift (a signal delay or a phase retardation) which depends on a current inputted via its control terminal. The LPF 14 provides a signal delay or a phase retardation which depends on a current inputted via its control terminal.

The equalizer 11 receives the input color signal via the apparatus input terminal 11E, and subjects the input color signal to a phase equalization process. Specifically, the equalizer 11 delays the input color signal by an adjustable phase retardation. The equalizer 11 outputs the resultant color signal to the equalizer 12 and the subtractor 18. The equalizer 12 subjects the color signal to a phase equalization process. Specifically, the equalizer 12 delays the color signal by an adjustable phase retardation. The equalizer 12 outputs the resultant color signal to the phase detector 15, the equalizer 13, the subtractor 17, and the adder 23. The equalizer 13 subjects the color signal to a phase equalization process. Specifically, the equalizer 13 delays the color signal by an adjustable phase retardation. The equalizer 13 outputs the resultant color signal to the subtractor 18.

Each of the equalizers 11, 12, and 13 is designed to have the following phase-frequency response characteristic. Under a normal condition, as shown in FIG. 2, the phase retardation provided by the equalizer 11, 12, or 13 is equal to 180 degrees (+180 degrees or −180 degrees) at a color subcarrier frequency fsc of the input color signal.

The LPF 14 is designed to have the following phase-frequency response characteristic. Under a normal condition, as shown in FIG. 3, the phase retardation provided by the LPF 14 is equal to 90 degrees at the color subcarrier frequency fsc of the input color signal.

The LPF 14 receives the input color signal via the apparatus input terminal 11E, and subjects the input color signal to a low-pass filtering process. During the low-pass filtering process, the LPF 14 delays the input color signal by an adjustable phase retardation. The output color signal of the LPF 14, that is, the filtering-resultant color signal, is fed to the phase detector 15. On the other hand, the equalization-resultant color signal is fed from the equalizer 12 to the phase detector 15.

Figure 11:
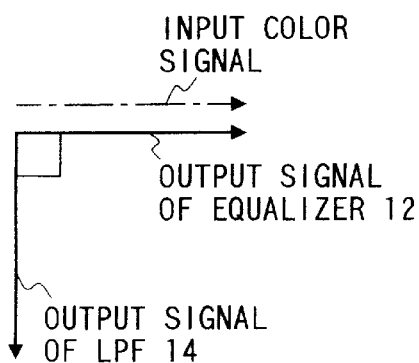
FIG. 11 is a diagram of the relation among the phases of signals in the apparatus of FIG. 10.

As shown in FIG. 11, under a normal condition, the output signal of the equalizer 12 retards from the input color signal by a phase of 360 degrees. Under a normal condition, the output signal of the LPF 14 retards from the input color signal by a phase of 90 degrees. Accordingly, there is normally a phase difference or a phase error of 90 degrees between the output signal of the LPF 14 and the output signal of the equalizer 12.

The phase detector 15 senses the difference between the phase of the output signal of the equalizer 12 (the equalization-resultant color signal) and the phase of the output signal of the LPF 14 (the filtering-resultant color signal). The phase detector 15 generates a voltage signal which depends on the sensed phase difference. The phase detector 15 outputs the phase-difference voltage signal to the voltage-to-current converter 16.

The voltage-to-current converter 16 converts the phase-difference voltage signal to a control current signal which depends on the phase difference sensed by the phase detector 15. The voltage-to-current converter 16 outputs the control current signal to the equalizers 11 and 12, and the LPF 14 so that the phase shift provided by the equalizer 11, the phase shift provided by the equalizer 12, and the phase retardation provided by the LPF 14 will be adjusted in response to the control current signal. The phase adjustment responsive to the control current signal is designed to maintain the phase difference between the output signal of the equalizer 12 (the equalization-resultant color signal) and the output signal of the LPF 14 (the filtering-resultant color signal) at 90 degrees or 270 degrees. Thus, the equalizers 11 and 12 are automatically adjusted.

For example, the directions of control of the phase retardations provided by the equalizers 11 and 12 and the LPF 14 are chosen as follows. If the phase difference between the output signal of the equalizer 12 and the output signal of the LPF 14 is greater than 90 degrees, the phase retardations provided by the equalizers 11 and 12 are increased while the phase retardation provided by the LPF 14 is decreased. If the phase difference between the output signal of the equalizer 11 and the output signal of the LPF 14 is smaller than 90 degrees, the phase retardations provided by the equalizer 11 and 12 are decreased while the phase retardation provided by the LPF 14 is increased.

In addition, the voltage-to-current converter 16 outputs the control current signal to the equalizer 13 so that the phase shift provided by the equalizer 13 will be adjusted in response to the control current signal. Thus, the equalizer 13 is automatically adjusted.

It should be noted that the phase retardation provided by the LPF 14 may be independent of the control current signal. In this case, the LPF 14 is of a fixed type.

The subtractor 17 receives the input color signal via the apparatus input terminal 11E. The subtractor 17 receives the output signal of the equalizer 12. The device 17 subtracts the output signal of the equalizer 12 from the input color signal, thereby extracting edge-representing components from the input color signal. The subtractor 17 informs the color edge signal generator 20 of the extracted edge-representing components. The color edge signal generator 20 produces a first color edge signal (a signal representing a color edge) in response to the edge-representing components. The color edge signal generator 20 outputs the first color edge signal to the comparator 21.

The luminance edge signal generator 19 receives the input luminance signal via the apparatus input terminal 19E. The luminance edge signal generator 19 produces a luminance edge signal (a signal representing a luminance edge) in response to the input luminance signal. The luminance edge signal generator 19 outputs the luminance edge signal to the comparator 21.

The device 21 compares the first color edge signal and the luminance edge signal, and generates a signal representing a coefficient which depends on the result of the comparison. The comparator 21 outputs the coefficient signal to the multiplier 22.

The subtractor 18 receives the output signal of the equalizer 11. Also, the subtractor 18 receives the output signal of the equalizer 13. The device 18 subtracts the output signal of the equalizer 13 from the output signal of the equalizer 11, thereby generating a second color edge signal. The subtractor 18 outputs the second color edge signal to the multiplier 22. The device 22 multiplies the second color edge signal by the coefficient which is represented by the output signal of the comparator 21. The device 22 outputs the multiplication-resultant color edge signal to the adder 23. As previously explained, the adder 23 receives the equalization-resultant color signal from the equalizer 12. The adder 23 combines the equalization-resultant color signal and the multiplication-resultant color edge signal into an edge-emphasized color signal (a quality-improved color signal). Thus, the quantity of addition of the second color edge signal to the equalization-resultant color signal depends on the coefficient represented by the output signal of the comparator 21, that is, depends on the result of the comparison between the first color edge signal and the luminance edge signal. The adder 23 feeds the edge-emphasized color signal to the apparatus output terminal 23E.

It is preferable to make the video signal processing apparatus of FIG. 10 into a single integrated circuit chip.

Ninth Embodiment

Figure 12:
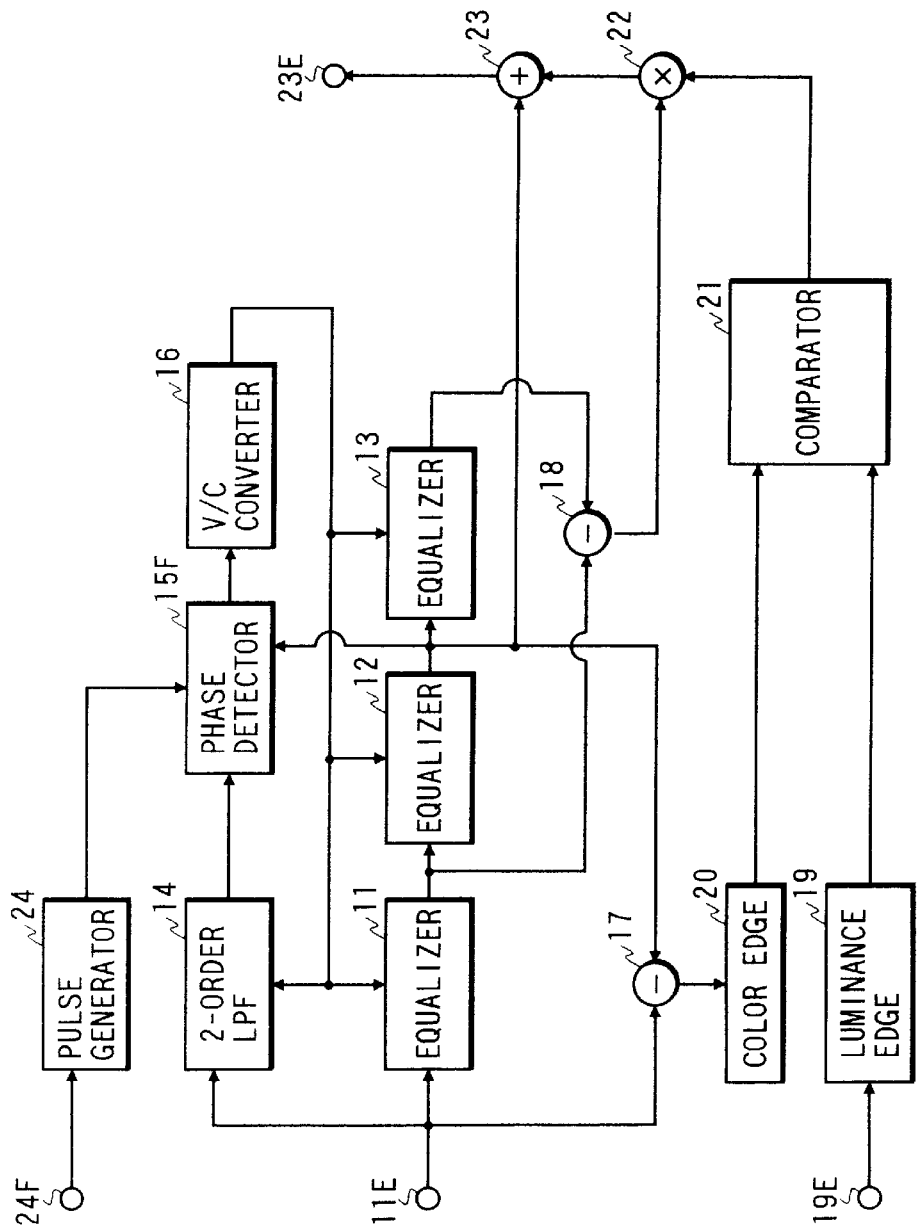
FIG. 12 is a block diagram of a video signal processing apparatus according to a ninth embodiment of this invention.

FIG. 12 shows a ninth embodiment of this invention which is similar to the embodiment of FIG. 10 except for an additional arrangement indicated hereinafter.

The embodiment of FIG. 12 includes a phase detector 15F instead of the phase detector 15 in FIG. 10. The embodiment of FIG. 12 also includes a pulse generator 24 connected between an apparatus input terminal 24F and the phase detector 15F. The pulse generator 24 receives a composite sync signal via the apparatus input terminal 24F. The composite sync signal is separated from a composite video signal by a suitable device (not shown). The pulse generator 24 responds to the composite sync signal, and periodically generates a gate pulse at a timing which corresponds to a burst period of the composite video signal. The pulse generator 24 periodically outputs the gate pulse to the phase detector 15F.

The phase detector 15F is selectively enabled and disabled in response to the gate pulses fed from the pulse generator 24. Specifically, during every burst period, the phase detector 15F remains enabled. During other periods, the phase detector 15F remains disabled or suspended.

Accordingly, it is possible to prevent equalizers 11, 12, and 13, and a second-order LPF 14 from being adversely affected by offset components in the output signal of the phase detector 15F which might occur during periods other than burst periods.

It is preferable to provide a voltage-to-current converter 16 with a circuit for averaging a control current signal in time base before the control current signal is outputted therefrom.

Tenth Embodiment

Figure 13:
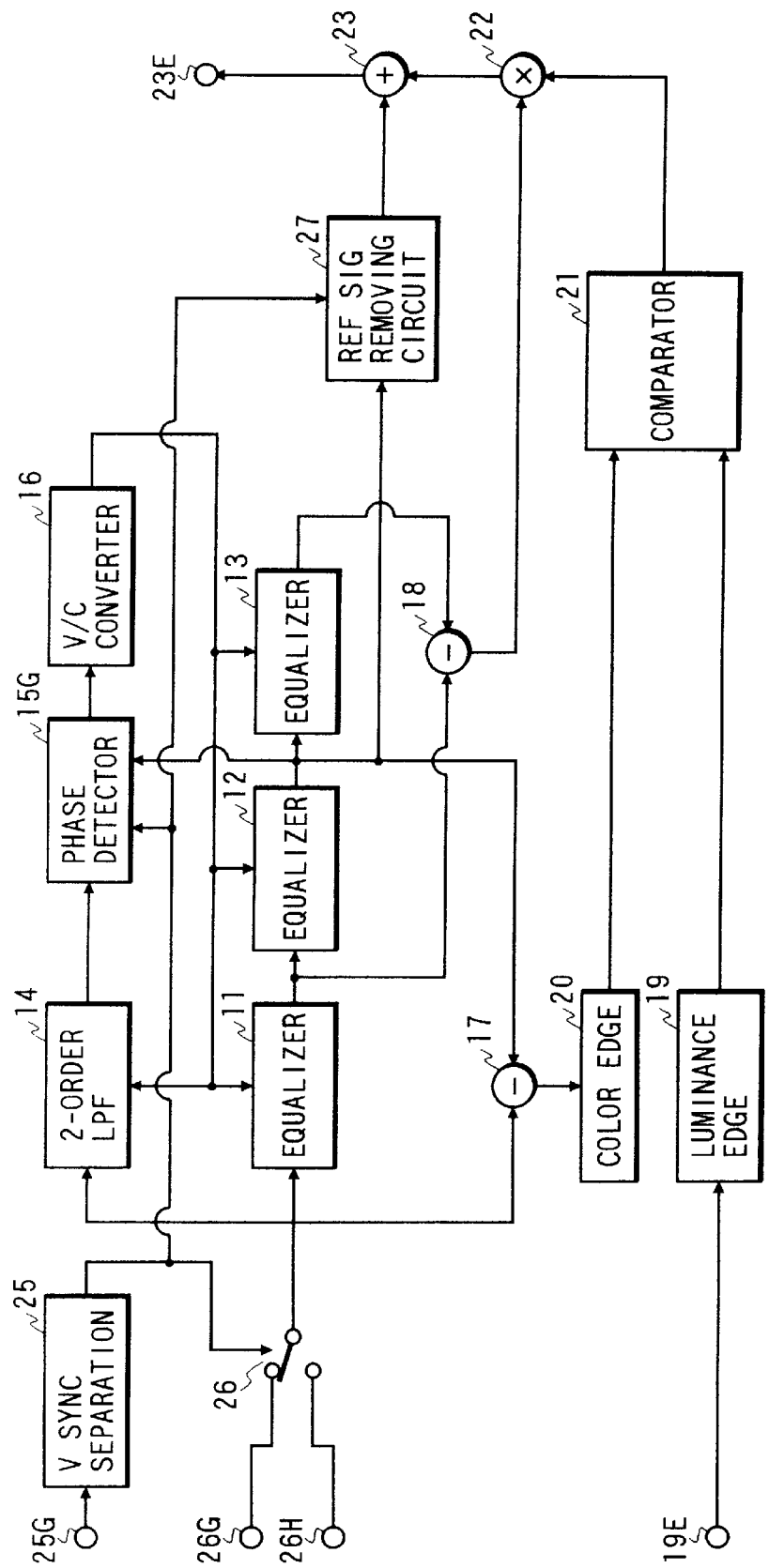
FIG. 13 is a block diagram of a video signal processing apparatus according to a tenth embodiment of this invention.

FIG. 13 shows a tenth embodiment of this invention which is similar to the embodiment of FIG. 10 except for an additional arrangement indicated hereinafter.

The embodiment of FIG. 13 includes a phase detector 15G instead of the phase detector 15 in FIG. 10. The embodiment of FIG. 13 also includes a vertical sync separation circuit 25, a switch 26, and a reference-signal removing circuit 27.

An apparatus input terminal 25G is followed by the vertical sync separation circuit 25. The output terminal of the vertical sync separation circuit 25 is connected to a control terminal of the phase detector 15G, a control terminal of the switch 26, and a control terminal of the reference-signal removing circuit 27. The switch 26 has first and second fixed contacts, and a movable contact. The movable contact of the switch 26 is connected to either the first fixed contact or the second fixed contact thereof in response to a signal inputted via its control terminal. The first and second fixed contacts of the switch 26 follow first and second apparatus input terminals 26G and 26H respectively. The movable contact of the switch 26 is followed by an equalizer 11, a second-order LPF 14, and a subtractor 17. The reference-signal removing circuit 27 is connected between an output side of the equalizer 12 and an input side of an adder 23.

The vertical sync separation circuit 25 receives a composite sync signal via the apparatus input terminal 25G. The composite sync signal is separated from a composite video signal by a suitable device (not shown). The vertical sync separation circuit 25 separates a vertical sync signal from the composite sync signal. The vertical sync separation circuit 25 outputs the vertical sync signal to the phase detector 15G, the switch 26, and the reference-signal removing circuit 27 as a control signal.

The apparatus input terminal 26G receives an input color signal which is separated from the composite vide signal by a suitable device (not shown in FIG. 13) such as a Y/C separation circuit. The input color signal travels from the apparatus input terminal 26G to the switch 26. The apparatus input terminal 26H receives a reference signal, for example, a color subcarrier, which is separated from the composite vide signal by a suitable device (not shown). The reference signal travels from the apparatus input terminal 26H to the switch 26.

The switch 26 selects one out of the input color signal and the reference signal in response to the vertical sync signal, and transmits the selected signal to the equalizer 11, the LPF 14, and the subtractor 17. Specifically, the switch 26 selects the reference signal during every vertical sync period. The switch 26 selects the color signal during other periods.

The phase detector 15G is selectively enabled and disabled in response to the vertical sync signal. Specifically, during every vertical sync period, the phase detector 15G remains enabled. During other periods, the phase detector 15G remains disabled or suspended.

The reference-signal removing circuit 27 receives an equalization-resultant color signal from the equalizer 12. The reference-signal removing circuit 27 selectively transmits the equalization-resultant color signal to the adder 23 in response to the vertical sync signal. Specifically, during every vertical sync period, the reference-signal removing circuit 27 blocks the travel of the equalization-resultant color signal toward the adder 23. During other periods, the reference-signal removing circuit 27 conducts the equalization-resultant color signal to the adder 23. Accordingly, the reference signal is removed from the equalization-resultant color signal. The reference-signal removing circuit 27 includes, for example, a switch.

It is possible to prevent the equalizers 11, 12, and 13, and the LPF 14 from being adversely affected by offset components in the output signal of the phase detector 15G which might occur during periods other than vertical sync periods. Furthermore, it is possible to prevent the equalizers 11, 12, and 13, and the LPF 14 from being adversely affected by the input color signal.

Figure 14:
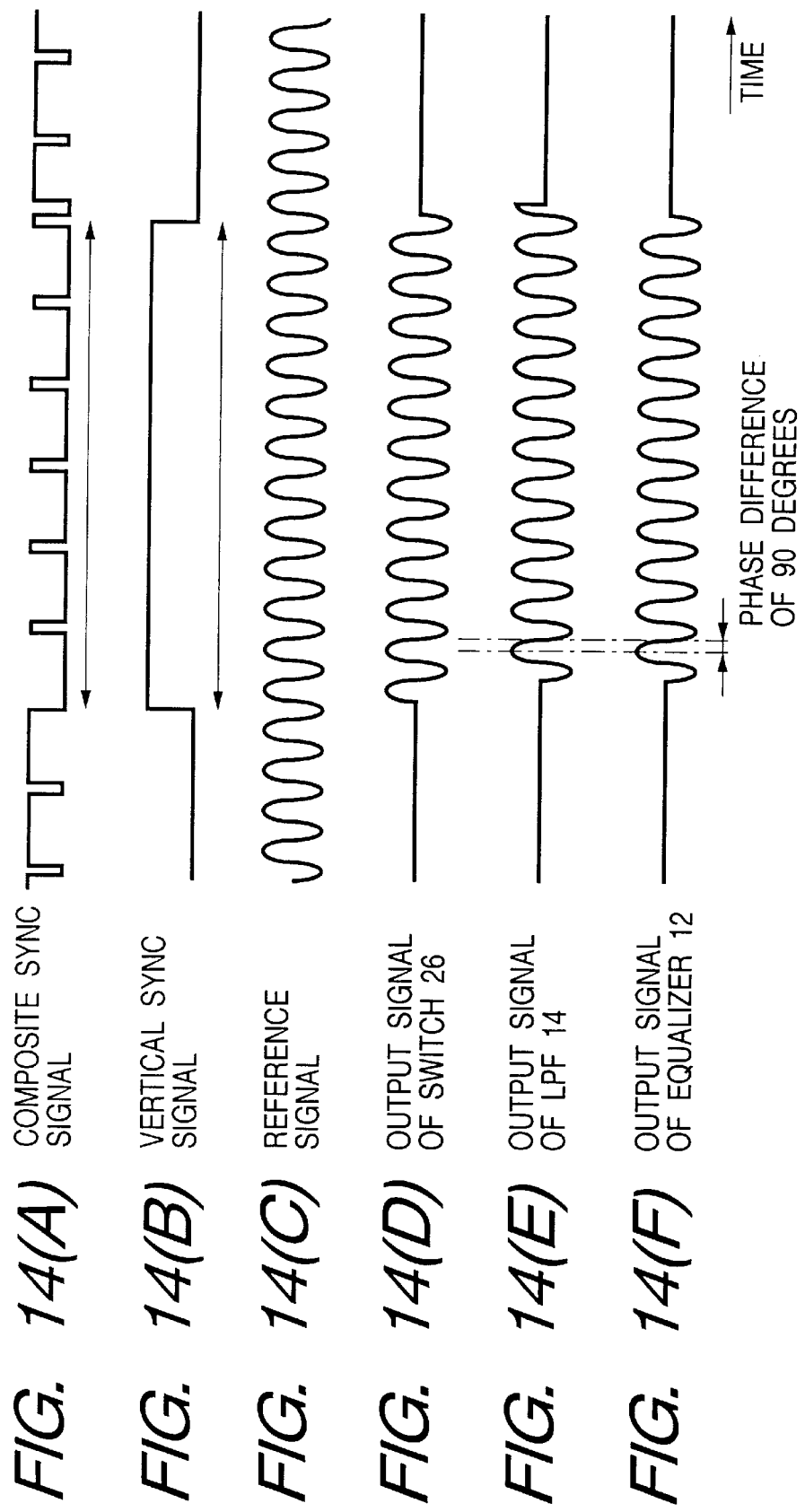
FIGS. 14(A), 14(B), 14(C), 14(D), 14(E), and 14(F) are time-domain diagrams of signals in the apparatus of FIG. 13.

As shown in FIGS. 14(A) and 14(B), a pulse (a vertical sync pulse) in the vertical sync signal outputted from the vertical sync separation circuit 25 responds to the composite sync signal. As shown in FIGS. 14(B), 14(C), and 14(D), during the presence of the vertical sync pulse, the reference signal is selected as an output signal of the switch 26. The LPF 14 delays the output signal of the switch 26 by a phase of 90 degrees. The combination of the equalizers 11 and 12 delays the output signal of the switch 26 by a phase of 360 degrees. Thus, as shown in FIGS. 14(E) and 14(F), the phase difference between the output signal of the LPF 14 and the output signal of the equalizer 12 is equal to 90 degrees.

It is preferable to provide a voltage-to-current converter 16 with a circuit for averaging a control current signal in time base before the control current signal is outputted therefrom.

Eleventh Embodiment

Figure 15:
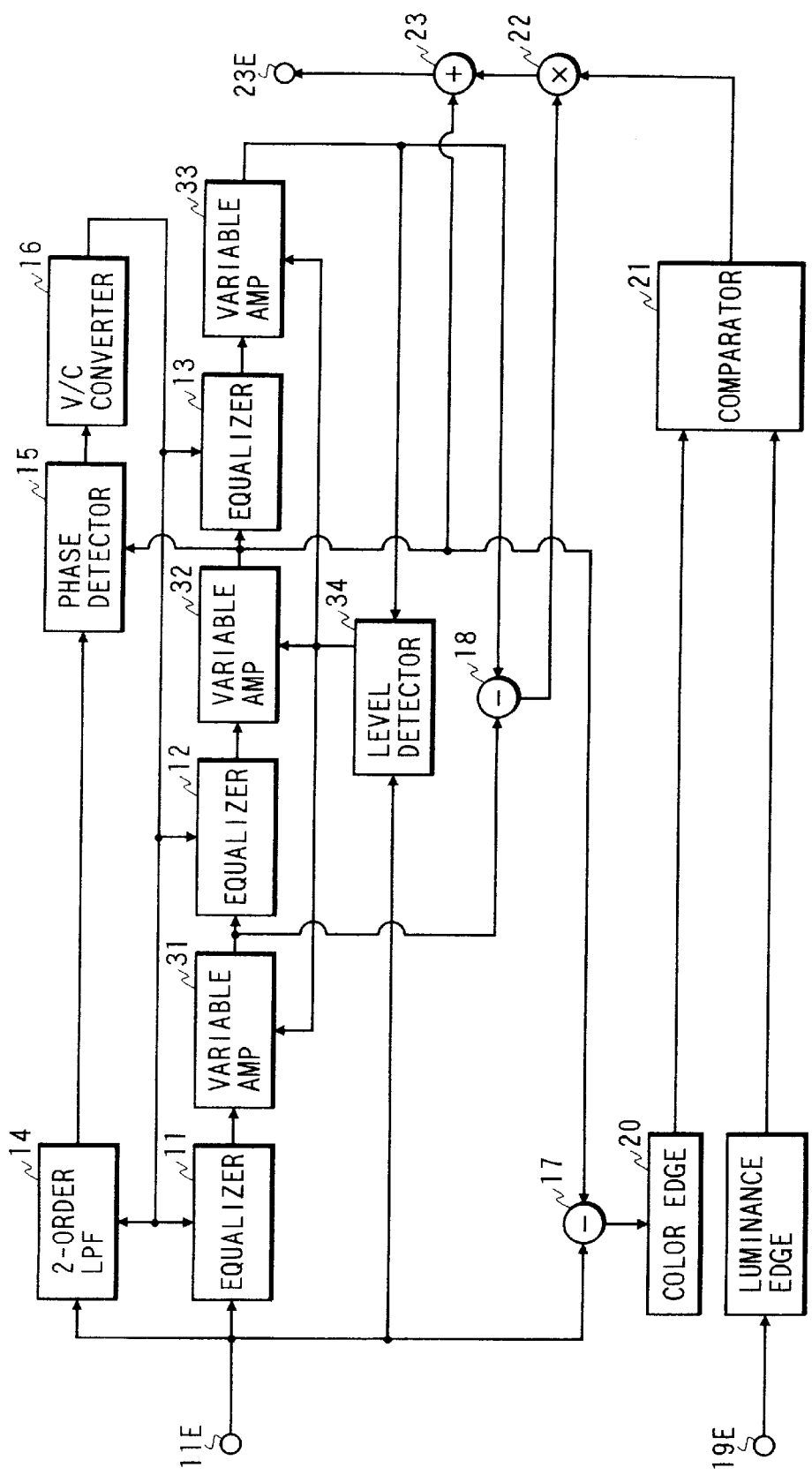
FIG. 15 is a block diagram of a video signal processing apparatus according to an eleventh embodiment of this invention.

FIG. 15 shows an eleventh embodiment of this invention which is similar to the embodiment of FIG. 10 except for an additional arrangement indicated hereinafter.

The embodiment of FIG. 15 includes a variable-gain amplifiers 31, 32, and 33, and a level detector 34. The level detector 34 is designed as shown in FIG. 20. An input side of the variable-gain amplifier 31 is connected to an output side of an equalizer 11. An output side of the variable-gain amplifier 31 is connected to an input side of an equalizer 12 and a first input terminal of a subtractor 18. An input side of the variable-gain amplifier 32 is connected to an output side of the equalizer 12. An output side of the variable-gain amplifier 32 is connected to an input side of a phase detector 15, an input side of an equalizer 13, an input side of a subtractor 17, and an input side of an adder 23. An input side of the variable-gain amplifier 33 is connected to an output side of the equalizer 13. An output side of the variable-gain amplifier 33 is connected to a first input terminal of the level detector 34 and a second input terminal of the subtractor 18. A second input side of the level detector 34 follows an apparatus input terminal 11E. An output side of the level detector 34 is connected to control terminals of the variable-gain amplifiers 31, 32, and 33 respectively.

The variable-gain amplifier 31 receives a color signal from the equalizer 11, and amplifies the color signal at a variable gain. The variable-gain amplifier 31 outputs the amplification-resultant color signal to the equalizer 12 and the subtractor 18. The equalizer 12 converts the output signal of the variable-gain amplifier 31 into an equalization-resultant color signal. The equalizer 12 outputs the equalization-resultant color signal to the variable-gain amplifier 32. The variable-gain amplifier 32 amplifies the equalization-resultant color signal at a variable gain. The variable-gain amplifier 32 outputs the amplification-resultant color signal to the phase detector 15, the equalizer 13, the subtractor 17, and the adder 23. The equalizer 13 delays the output signal of the variable-gain amplifier 32 by an adjustable phase retardation. The equalizer 13 outputs the resultant signal to the variable-gain amplifier 33. The variable-gain amplifier 33 amplifies the output signal of the equalizer 13 at a variable gain. The variable-gain amplifier 33 outputs the amplification-resultant color signal to the subtractor 18 and the level detector 34.

The level detector 34 receives an input color signal via the apparatus input terminal 11E. The level detector 34 receives the output signal of the variable-gain amplifier 33. The level detector 34 compares the level of the input color signal and the level of the output signal of the variable-gain amplifier 31, and generates a control signal depending on the result of the level comparison. The level detector 34 outputs the control signal to the variable-gain amplifiers 31, 32, and 33. The gains of the variable-gain amplifiers 31, 32, and 33 are adjusted in response to the control signal. The gain control of the variable-gain amplifiers 31, 32, and 33 is designed so that the level of the output signal of the variable-gain amplifier 33 will be equal to the level of the input color signal.

Accordingly, it is possible to compensate for signal level variations caused by the equalizers 11, 12, and 13.

Twelfth Embodiment

Figure 16:
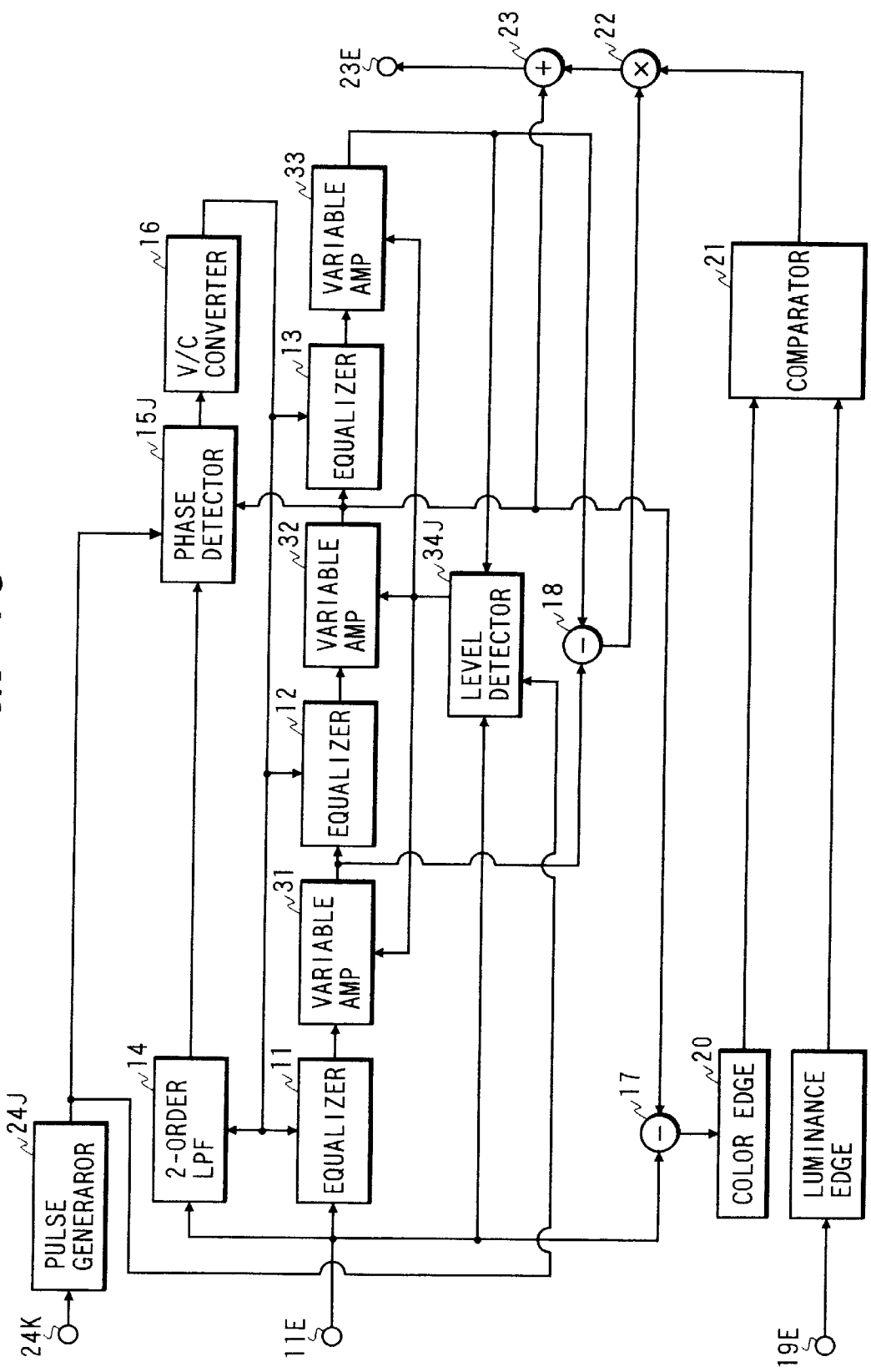
FIG. 16 is a block diagram of a video signal processing apparatus according to a twelfth embodiment of this invention.

FIG. 16 shows a twelfth embodiment of this invention which is similar to the embodiment of FIG. 15 except for an additional arrangement indicated hereinafter.

The embodiment of FIG. 16 includes a phase detector 15J instead of the phase detector 15 in FIG. 15. Also, the embodiment of FIG. 16 includes a level detector 34J instead of the level detector 34 in FIG. 15. Basically, the level detector 34J is similar in structure to the level detector 34 in FIG. 20. Furthermore, the embodiment of FIG. 16 includes a pulse generator 24J.

An input side of the pulse generator 24J follows an apparatus input terminal 24K. An output side of the pulse generator 24J is connected to a control terminal of the phase detector 15J and a control terminal of the level detector 34J.

The pulse generator 24J receives a composite sync signal via the apparatus input terminal 24K. The composite sync signal is separated from a composite video signal by a suitable device (not shown). The pulse generator 24J responds to the composite sync signal, and periodically generates a gate pulse at a timing which corresponds to a burst period of the composite video signal. The pulse generator 24J periodically outputs the gate pulse to the phase detector 15J and the level detector 34J.

The phase detector 15J is selectively enabled and disabled in response to the gate pulses fed from the pulse generator 24J. Specifically, during every burst period, the phase detector 15J remains enabled. During other periods, the phase detector 15J remains disabled or suspended.

The level detector 34J is selectively enabled and disabled in response to the gate pulses fed from the pulse generator 24J. Specifically, during every burst period, the level detector 34J remains enabled. During other periods, the level detector 34J remains disabled or suspended.

Accordingly, it is possible to prevent equalizers 11, 12, and 13, and a second-order LPF 14 from being adversely affected by offset components in the output signal of the phase detector 15J which might occur during periods other than burst periods.

It is preferable to provide a voltage-to-current converter 16 with a circuit for averaging a control current signal in time base before the control current signal is outputted therefrom.

It is preferable to provide the level detector 34J with a circuit for averaging a control signal in time base before the control signal is outputted therefrom.

Thirteenth Embodiment

Figure 17:
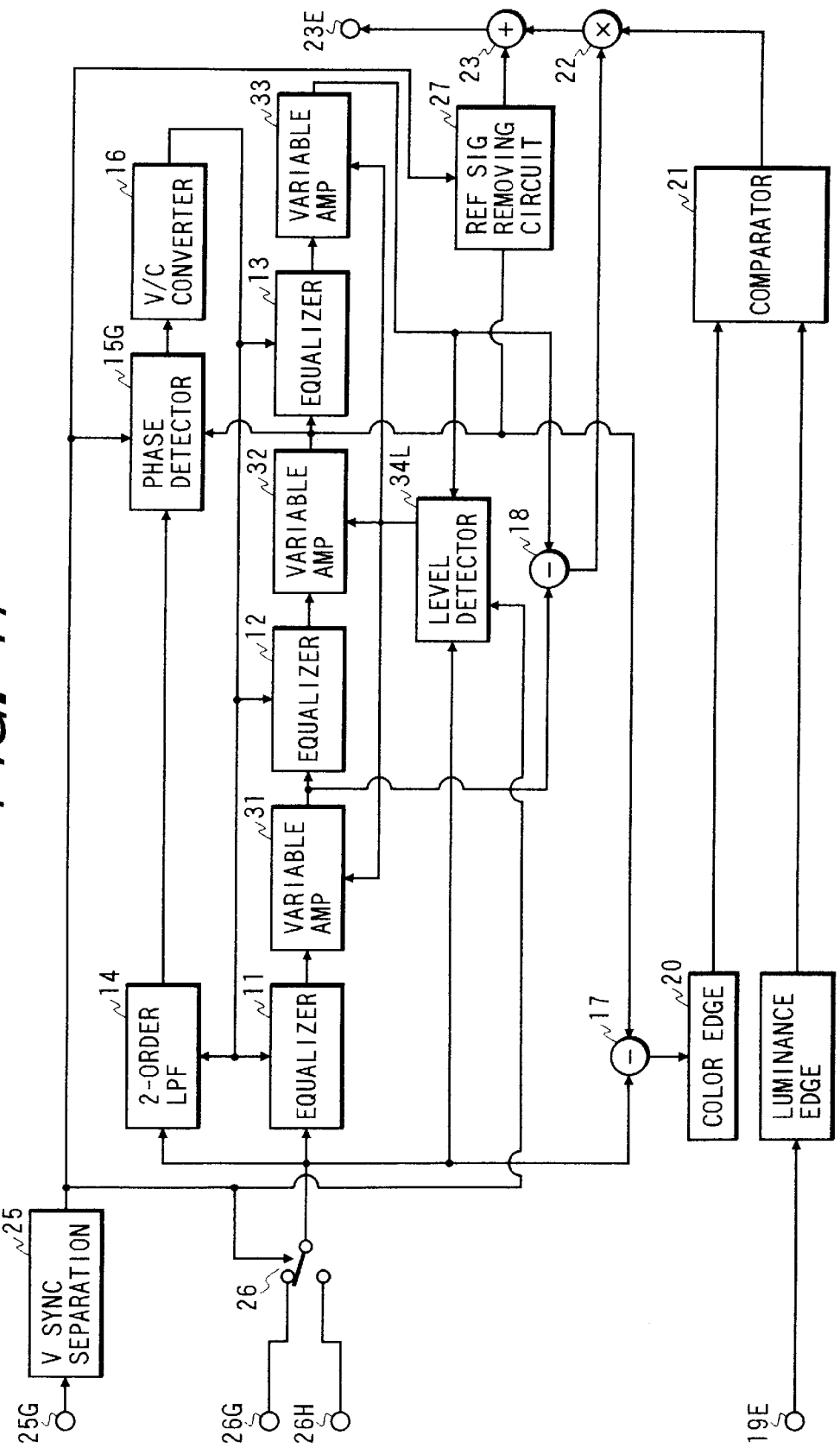
FIG. 17 is a block diagram of a video signal processing apparatus according to a thirteenth embodiment of this invention.

FIG. 17 shows a thirteenth embodiment of this invention which is similar to the embodiment of FIG. 13 except for an additional arrangement indicated hereinafter.

The embodiment of FIG. 17 includes variable-gain amplifiers 31, 32, and 33, and a level detector 34L. Basically, the level detector 34L is similar in structure to the level detector 34 in FIG. 20. An input side of the variable-gain amplifier 31 is connected to an output side of an equalizer 11. An output side of the variable-gain amplifier 31 is connected to an input side of an equalizer 12 and a first input terminal of a subtractor 18. An input side of the variable-gain amplifier 32 is connected to an output side of the equalizer 12. An output side of the variable-gain amplifier 32 is connected to an input side of a phase detector 15G, an input side of an equalizer 13, an input side of a subtractor 17, and an input side of a reference signal removing circuit 27. An input side of the variable-gain amplifier 33 is connected to an output side of the equalizer 13. An output side of the variable-gain amplifier 33 is connected to a first input terminal of the level detector 34L and a second input terminal of the subtractor 18. A second input side of the level detector 34L follows a movable contact of a switch 26. An output side of the level detector 34L is connected to control terminals of the variable-gain amplifiers 31, 32, and 33 respectively. The level detector 34L has a control terminal connected to an output side of a vertical sync separation circuit 25.

The variable-gain amplifier 31 receives a color signal from the equalizer 11, and amplifies the color signal at a variable gain. The variable-gain amplifier 31 outputs the amplification-resultant color signal to the equalizer 12 and the subtractor 18. The equalizer 12 converts the output signal of the variable-gain amplifier 31 into an equalization-resultant color signal. The equalizer 12 outputs the equalization-resultant color signal to the variable-gain amplifier 32. The variable-gain amplifier 32 amplifies the equalization-resultant color signal at a variable gain. The variable-gain amplifier 32 outputs the amplification-resultant color signal to the phase detector 15G, the equalizer 13, the subtractor 17, and the reference-signal removing circuit 27. The equalizer 13 delays the output signal of the variable-gain amplifier 32 by an adjustable phase retardation. The equalizer 13 outputs the resultant signal to the variable-gain amplifier 33. The variable-gain amplifier 33 amplifies the output signal of the equalizer 13 at a variable gain. The variable-gain amplifier 33 outputs the amplification-resultant color signal to the subtractor 18 and the level detector 34L.

The level detector 34L is selectively enabled and disabled in response to a vertical sync signal fed from the vertical sync separation circuit 25. Specifically, during every vertical sync period, the level detector 34L remains enabled. During other periods, the level detector 34L remains disabled or suspended.

During every vertical sync period, the level detector 34L receives a reference signal from the switch 26. Simultaneously, the level detector 34L receives the output signal of the variable-gain amplifier 33. The level detector 34L compares the level of the reference signal and the level of the output signal of the variable-gain amplifier 33, and generates a control signal depending on the result of the level comparison. The level detector 34L outputs the control signal to the variable-gain amplifiers 31, 32, and 33. The gains of the variable-gain amplifiers 31, 32, and 33 are adjusted in response to the control signal. The gain control of the variable-gain amplifiers 31, 32, and 33 is designed so that the level of the output signal of the variable-gain amplifier 33 will be equal to the level of the reference signal.

Accordingly, it is possible to compensate for signal level variations caused by the equalizers 11, 12, and 13.

It is preferable to provide the level detector 34L with a circuit for averaging the control signal in time base before the control signal is outputted therefrom.

Fourteenth Embodiment

Figure 18:
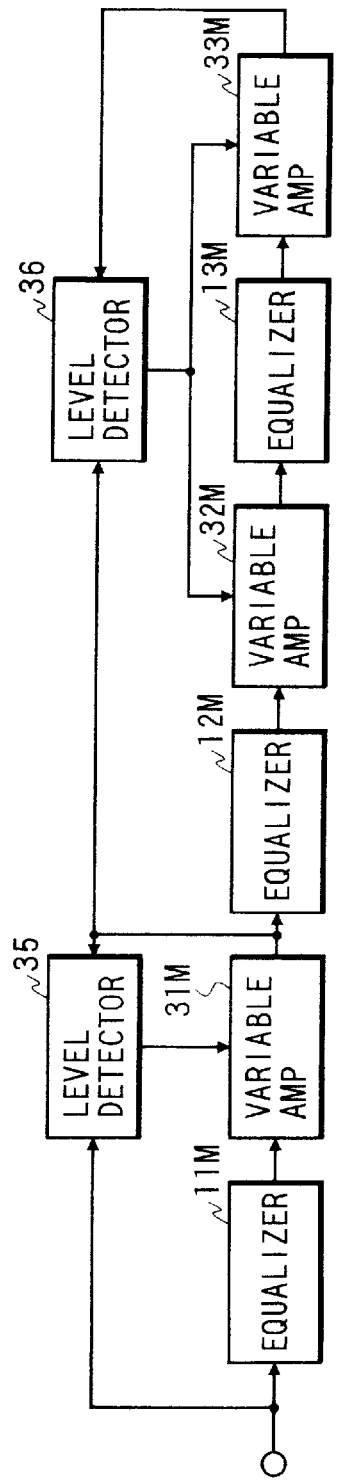
FIG. 18 is a block diagram of a portion of a video signal processing apparatus according to a fourteenth embodiment of this invention.

FIG. 18 shows a portion of a fourteenth embodiment of this invention which is a modification of the embodiment of FIG. 15, the embodiment of FIG. 16, or the embodiment of FIG. 17.

The embodiment of FIG. 18 includes equalizers 11M, 12M, and 13M instead of the equalizers 11, 12, and 13 (see FIG. 15, FIG. 16, or FIG. 17). Also, the embodiment of FIG. 18 includes variable-gain amplifiers 31M, 32M, and 33M instead of the variable-gain amplifiers 31, 32, and 33 (see FIG. 15, FIG. 16, or FIG. 17). Furthermore, the embodiment of FIG. 18 includes level detectors 35 and 36. Basically, each of the level detectors 35 and 36 is similar in structure to the level detector 34 in FIG. 20.

The equalizer 11M, the variable-gain amplifier 31M, the equalizer 12M, the variable-gain amplifier 32M, the equalizer 13M, and the variable-gain amplifier 33M are successively connected in that order. An input color signal is fed via an apparatus input terminal to an input side of the equalizer 11M and a first input terminal of the level detector 35. An output side of the variable-gain amplifier 31M is connected to a second input terminal of the level detector 35 and a first input terminal of the level detector 36. An output side of the variable-gain amplifier 33M is connected to a second input terminal of the level detector 36. The variable-gain amplifier 31M has a control terminal connected to an output side of the level detector 35. The variable-gain amplifiers 32M and 33M have control terminals connected to an output side of the level detector 36.

The equalizers 12M and 13M have equal characteristics. The equalizer 11M has a characteristic different from that of the equalizer 12M or 13M.

The level detector 35 receives the input color signal via the apparatus input terminal. Also, the level detector 35 receives an output signal of the variable-gain amplifier 31M. The level detector 35 compares the level of the input color signal and the level of the output signal of the variable-gain amplifier 31M, and generates a control signal depending on the result of the level comparison. The level detector 35 outputs the control signal to the variable-gain amplifier 31M. The gain of the variable-gain amplifier 31M is adjusted in response to the control signal. The gain control of the variable-gain amplifier 31M is designed so that the level of the output signal of the variable-gain amplifier 31M will be equal to the level of the input color signal.

The level detector 36 receives the output signal of the variable-gain amplifier 31M. Also, the level detector 36 receives an output signal of the variable-gain amplifier 33M. The level detector 36 compares the level of the output signal of the variable-gain amplifier 31M and the level of the output signal of the variable-gain amplifier 33M, and generates a-control signal depending on the result of the level comparison. The level detector 36 outputs the control signal to the variable-gain amplifiers 32M and 33M. The gains of the variable-gain amplifiers 32M and 33M are adjusted in response to the control signal. The gain control of the variable-gain amplifiers 32M and 33M is designed so that the level of the output signal of the variable-gain amplifier 33M will be equal to the level of the output signal of the variable-gain amplifier 31M.

Accordingly, it is possible to compensate for signal level variations caused by the equalizers 11M, 12M, and 13M.

Fifteenth Embodiment

Figure 19:
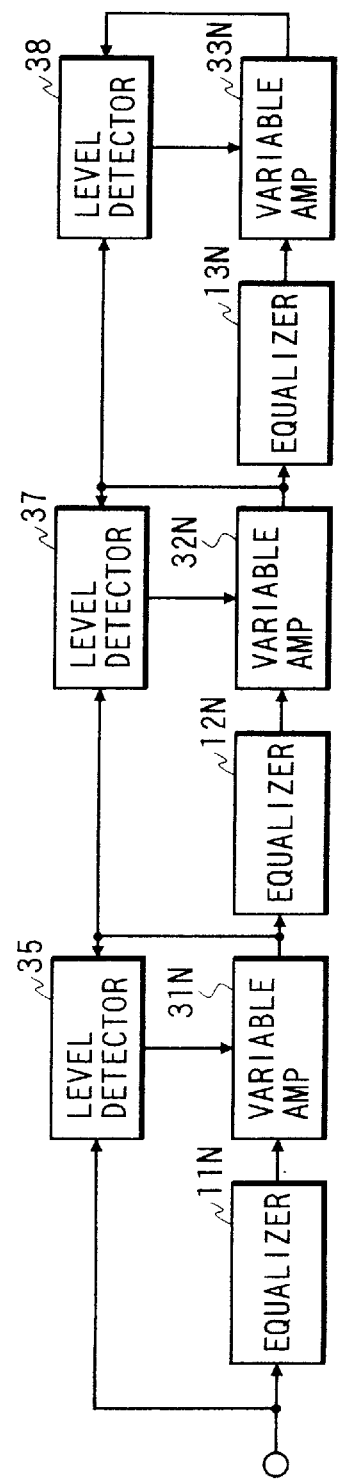
FIG. 19 is a block diagram of a portion of a video signal processing apparatus according to a fifteenth embodiment of this invention.

FIG. 19 shows a portion of a fifteenth embodiment of this invention which is a modification of the embodiment of FIG. 15, the embodiment of FIG. 16, or the embodiment of FIG. 17.

The embodiment of FIG. 19 includes equalizers 11N, 12N, and 13N instead of the equalizers 11, 12, and 13 (see FIG. 15, FIG. 16, or FIG. 17). Also, the embodiment of FIG. 19 includes variable-gain amplifiers 31N, 32N, and 33N instead of the variable-gain amplifiers 31, 32, and 33 (see FIG. 15, FIG. 16, or FIG. 17). Furthermore, the embodiment of FIG. 18 includes level detectors 35, 37, and 38. Basically, each of the level detectors 35, 37, and 38 is similar in structure to the level detector 34 in FIG. 20.

The equalizer 11N, the variable-gain amplifier 31N, the equalizer 12N, the variable-gain amplifier 32N, the equalizer 13N, and the variable-gain amplifier 33N are successively connected in that order. An input color signal is fed via an apparatus input terminal to an input side of the equalizer 11N and a first input terminal of the level detector 35. An output side of the variable-gain amplifier 31N is connected to a second input terminal of the level detector 35 and a first input terminal of the level detector 37. An output side of the variable-gain amplifier 32N is connected to a second input terminal of the level detector 37 and a first input terminal of the level detector 38. An output side of the variable-gain amplifier 33N is connected to a second input terminal of the level detector 38. The variable-gain amplifier 31N has a control terminal connected to an output side of the level detector 35. The variable-gain amplifier 32N has a control terminal connected to an output side of the level detector 37. The variable-gain amplifier 33N has a control terminal connected to an output side of the level detector 38.

The equalizers 11N, 12N, and 13N have different characteristics respectively.

The level detector 35 receives the input color signal via the apparatus input terminal. Also, the level detector 35 receives an output signal of the variable-gain amplifier 31N. The level detector 35 compares the level of the input color signal and the level of the output signal of the variable-gain amplifier 31N, and generates a control signal depending on the result of the level comparison. The level detector 35 outputs the control signal to the variable-gain amplifier 31N. The gain of the variable-gain amplifier 31N is adjusted in response to the control signal. The gain control of the variable-gain amplifier 31N is designed so that the level of the output signal of the variable-gain amplifier 31N will be equal to the level of the input color signal.

The level detector 37 receives the output signal of the variable-gain amplifier 31N. Also, the level detector 37 receives an output signal of the variable-gain amplifier 32N. The level detector 37 compares the level of the output signal of the variable-gain amplifier 31N and the level of the output signal of the variable-gain amplifier 32N, and generates a control signal depending on the result of the level comparison. The level detector 37 outputs the control signal to the variable-gain amplifier 32N. The gain of the variable-gain amplifier 32N is adjusted in response to the control signal. The gain control of the variable-gain amplifier 32N is designed so that the level of the output signal of the variable-gain amplifier 32N will be equal to the level of the output signal of the variable-gain amplifier 31N.

The level detector 38 receives the output signal of the variable-gain amplifier 32N. Also, the level detector 38 receives an output signal of the variable-gain amplifier 33N. The level detector 38 compares the level of the output signal of the variable-gain amplifier 32N and the level of the output signal of the variable-gain amplifier 33N, and generates a control signal depending on the result of the level comparison. The level detector 38 outputs the control signal to the variable-gain amplifier 33N. The gain of the variable-gain amplifier 33N is adjusted in response to the control signal. The gain control of the variable-gain amplifier 33N is designed so that the level of the output signal of the variable-gain amplifier 33N will be equal to the level of the output signal of the variable-gain amplifier 32N.

Accordingly, it is possible to compensate for signal level variations caused by the equalizers 11N, 12N, and 13N.

Sixteenth Embodiment

Figure 21:
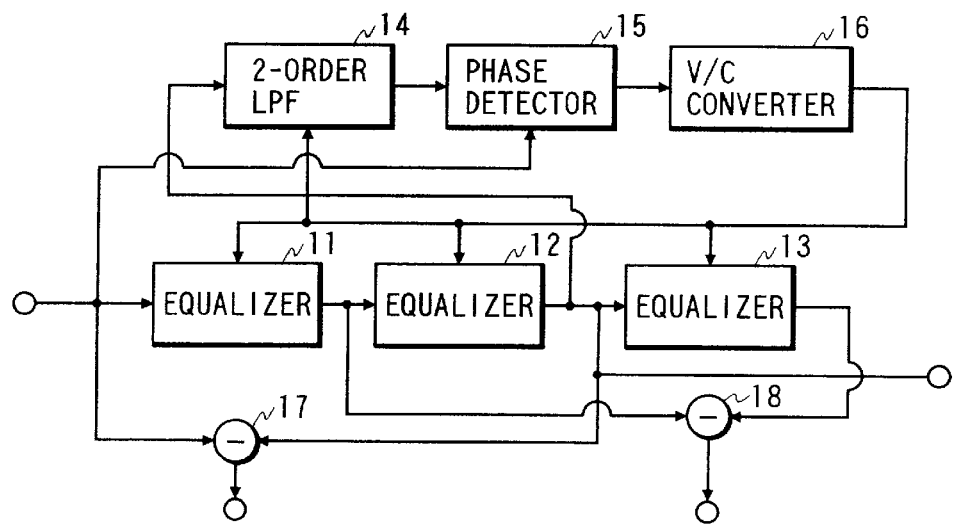
FIG. 21 is a block diagram of a portion of a video signal processing apparatus according to a sixteenth embodiment of this invention.

FIG. 21 shows a portion of a sixteenth embodiment of this invention which is a modification of the embodiment of FIG. 10, the embodiment of FIG. 12, or the embodiment of FIG. 13.

In the embodiment of FIG. 21, an input color signal is fed via an apparatus input terminal to a first input terminal of a phase detector 15. An input side of a second-order LPF 14 is connected to an output side of an equalizer 12. An output side of the LPF 14 is connected to a second input terminal of the phase detector 15.

In the embodiment of FIG. 21, the phase detector 15 senses the difference between the phase of the input color signal and the phase of the output signal of the LPF 14. The phase detector 15 generates a voltage signal which depends on the sensed phase difference. The phase detector 15 outputs the phase-difference voltage signal to a voltage-to-current converter 16.

Seventeenth Embodiment

Figure 22:
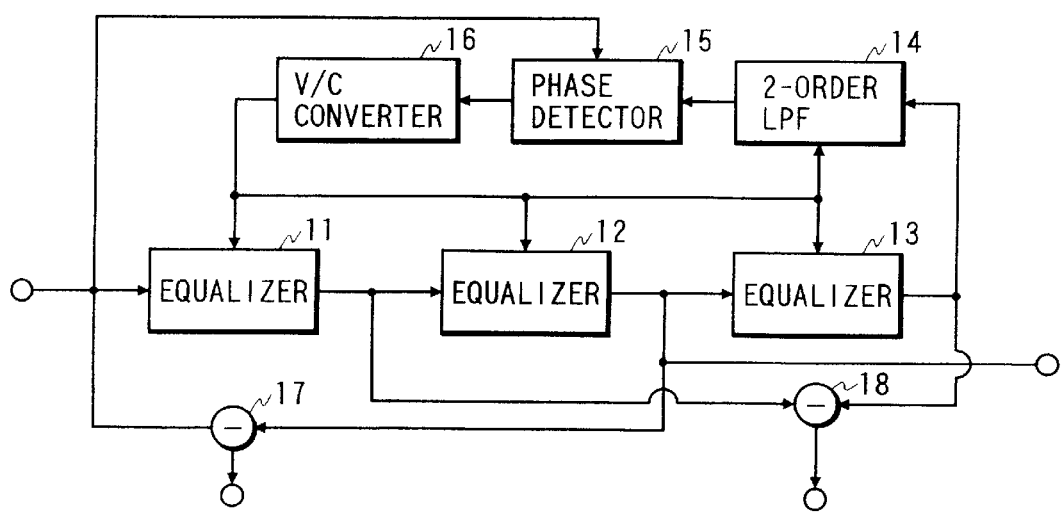
FIG. 22 is a block diagram of a portion of a video signal processing apparatus according to a seventeenth embodiment of this invention.

FIG. 22 shows a portion of a seventeenth embodiment of this invention which is a modification of the embodiment of FIG. 10, the embodiment of FIG. 12, or the embodiment of FIG. 13.

In the embodiment of FIG. 22, an input color signal is fed via an apparatus input terminal to a first input terminal of a phase detector 15. An input side of a second-order LPF 14 is connected to an output side of an equalizer 13. An output side of the LPF 14 is connected to a second input terminal of the phase detector 15.

In the embodiment of FIG. 22, the LPF 14 processes an output signal of the equalizer 13. The phase detector 15 senses the difference between the phase of the input color signal and the phase of the output signal of the LPF 14. The phase detector 15 generates a voltage signal which depends on the sensed phase difference. The phase detector 15 outputs the phase-difference voltage signal to a voltage-to-current converter 16.

Eighteenth Embodiment

Figure 23:
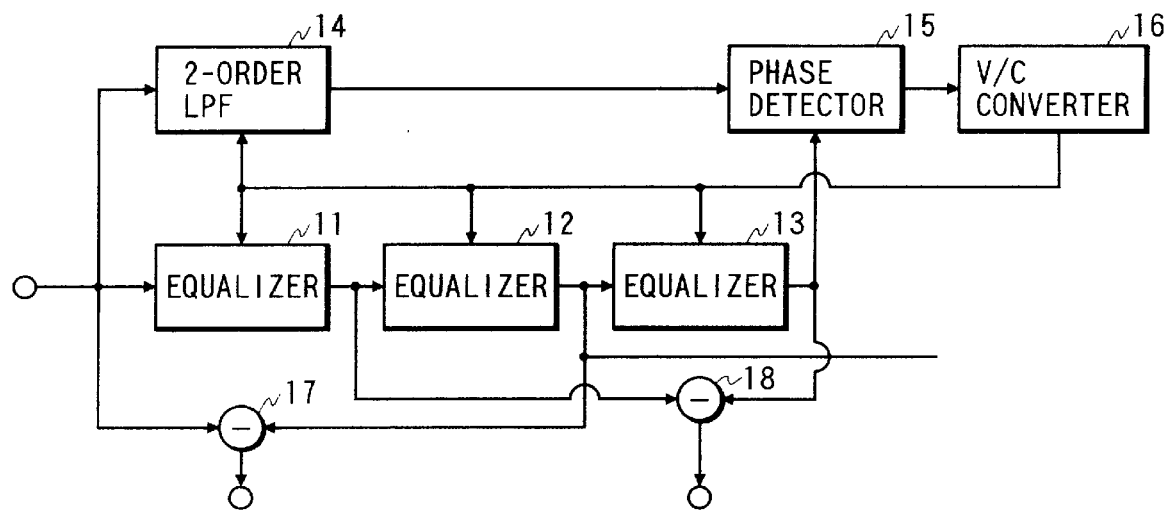
FIG. 23 is a block diagram of a portion of a video signal processing apparatus according to an eighteenth embodiment of this invention.

FIG. 23 shows a portion of an eighteenth embodiment of this invention which is a modification of the embodiment of FIG. 10, the embodiment of FIG. 12, or the embodiment of FIG. 13.

In the embodiment of FIG. 23, an output side of a second-order LPF 14 is connected to a first input terminal of a phase detector 15. A second input terminal of the phase detector 15 is connected to an output side of an equalizer 13.

In the embodiment of FIG. 23, the phase detector 15 senses the difference between the phase of the output signal of the LPF 14 and the phase of the output signal of the equalizer 13. The phase detector 15 generates a voltage signal which depends on the sensed phase difference. The phase detector 15 outputs the phase-difference voltage signal to a voltage-to-current converter 16.

Nineteenth Embodiment

Figure 24:
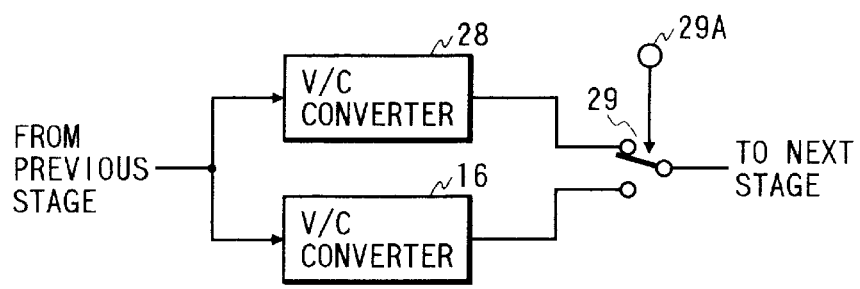
FIG. 24 is a block diagram of a portion of a video signal processing apparatus according to a nineteenth embodiment of this invention.

FIG. 24 shows a portion of a nineteenth embodiment of this invention which is a modification of the embodiment of FIG. 1, the embodiment of FIG. 4, the embodiment of FIG. 5, the embodiment of FIG. 6, the embodiment of FIG. 7, the embodiment of FIG. 8, the embodiment of FIG. 9, the embodiment of FIG. 10, the embodiment of FIG. 12, the embodiment of FIG. 13, the embodiment of FIG. 15, the embodiment of FIG. 16, the embodiment of FIG. 17, the embodiment of FIG. 18, the embodiment of FIG. 19, the embodiment of FIG. 21, the embodiment of FIG. 22, or the embodiment of FIG. 23.

The embodiment of FIG. 24 includes voltage-to-current converters 16 and 28, and a switch 29. The voltage-to-current converter 16 is designed for a color signal of a first television format such as NTSC. The voltage-to-current converter 28 is designed for a color signal of a second television format such as PAL.

Input sides of the voltage-to-current converters 16 and 28 are connected in common to a previous stage. The switch 29 has a control terminal connected to an apparatus input terminal 29A. The switch 29 has first and second fixed contacts, and a movable contact. The movable contact of the switch 29 is connected to either the first fixed contact or the second fixed contact thereof in response to a signal inputted via its control terminal. The first fixed contact of the switch 29 is connected to an output side of the voltage-to-current converter 16. The second fixed contact of the switch 29 is connected to an output side of the voltage-to-current converter 28. The movable contact of the switch 29 leads to a next stage.

A mode change signal is fed to the switch 29 via the apparatus input terminal 29A. The switch 29 responds to the mode change signal. The mode change signal depends on whether an input color signal is of the first television format or the second television format. The switch 29 selects either an output signal of the voltage-to-current converter 16 or an output signal of the voltage-to-current converter 28 in response to the mode change signal. The switch 29 transmits the selected signal to the next stage. Accordingly, the switch 29 selects one out of the voltage-to-current converters 16 and 28 as an effective device in response to the mode change signal. Specifically, the switch 29 selects the voltage-to-current converter 16 when the input color signal is of the first television format. The switch 29 selects the voltage-to-current converter 28 when the input color signal is of the second television format.

Twentieth Embodiment

Figure 25:
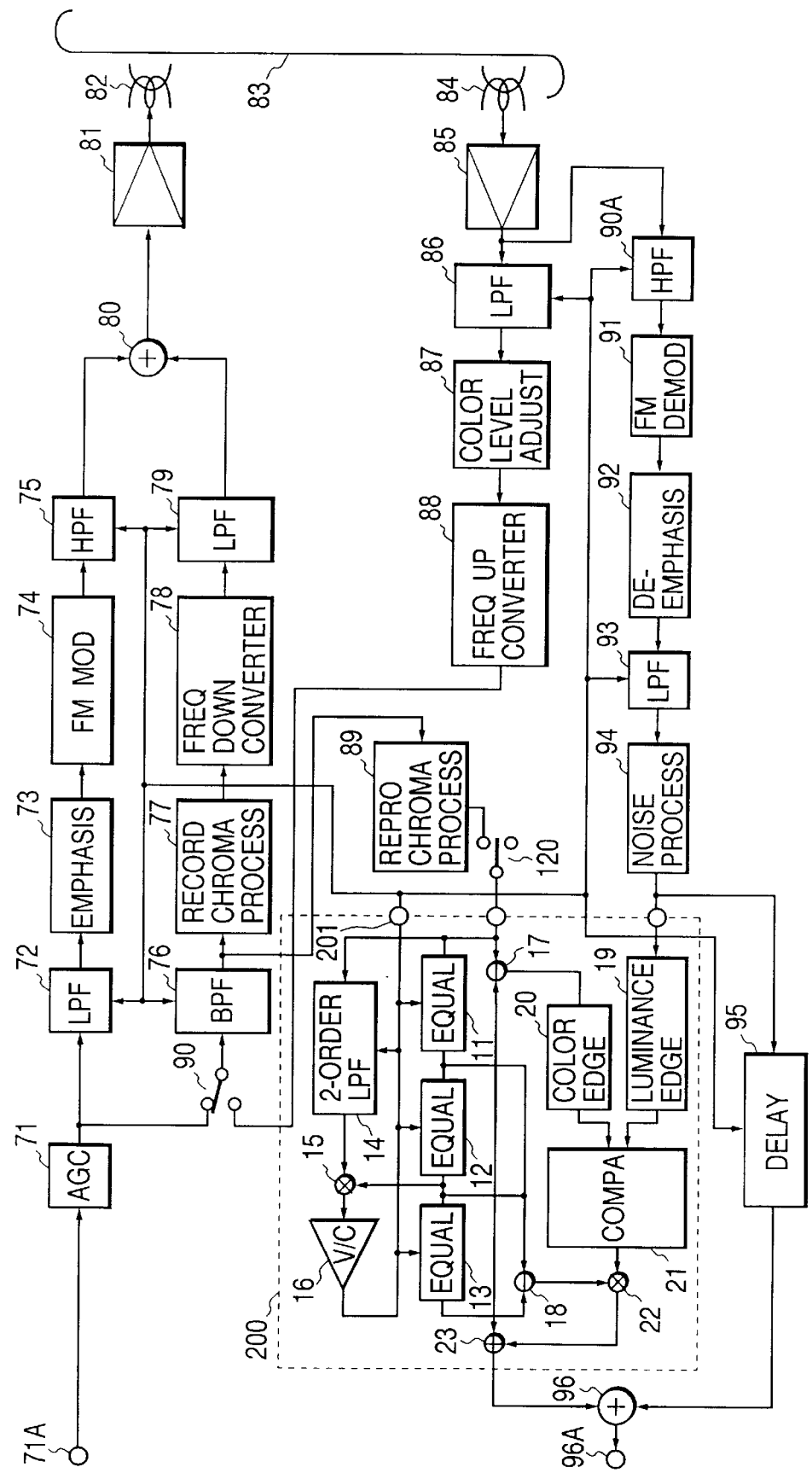
FIG. 25 is a block diagram of a magnetic recording and reproducing system including a video signal processing apparatus according to a twentieth embodiment of this invention.

With reference to FIG. 25, a magnetic recording and reproducing system has a recording side and a reproducing side.

The recording side of the system includes an AGC circuit 71, an adjustable LPF (low pass filter) 72, an emphasis circuit 73, an FM modulator 74, an adjustable HPF (high pass filter) 75, an adjustable BPF (band pass filter) 76, a recording chroma processor 77, a frequency down converter 78, an adjustable LPF 79, an adder 80, a recording amplifier 81, and a magnetic head 82.

A system input terminal 71A leads to an input side of the AGC circuit 71. The AGC circuit 71 is successively followed by the LPF 72, the emphasis circuit 73, the FM modulator 74, and the HPF 75. A switch 90 has first and second fixed contacts, and a movable contact. The movable contact of the switch 90 is selectively connected to either the first fixed contact or the second fixed contact thereof. The output side of the AGC circuit 71 leads to the first fixed contact of the switch 90. The movable contact of the switch 90 leads to an input side of the BPF 76. The BPF 76 is successively followed by the recording chroma processor 77, the frequency down converter 78, and the LPF 79.

The output terminal of the HPF 75 is connected to a first input terminal of the adder 80. The output terminal of the LPF 79 is connected to a second input terminal of the adder 80. The output terminal of the adder 80 is connected via the recording amplifier 81 to the magnetic head 82. The magnetic head 82 is designed to scan a magnetic tape 83.

The reproducing side of the system includes a magnetic head 84, a reproducing amplifier 85, an adjustable LPF 86, an automatic color level adjuster 87, a frequency up converter 88, a reproducing chroma processor 89, a video signal processing apparatus 200, an adjustable HPF 90A, an FM demodulator 91, a deemphasis circuit 92, an adjustable LPF 93, a noise processor 94, a variable delay circuit 95, and an adder 96.

The magnetic head 84 is designed to scan the magnetic tape 83. The magnetic head 84 leads to the input terminal of the reproducing amplifier 85. The output terminal of the reproducing amplifier 85 is connected to the input terminals of the LPF 86 and the HPF 90A.

The LPF 86 is successively followed by the automatic color level adjuster 87 and the frequency up converter 88. The output terminal of the frequency up converter 88 leads to the second fixed contact of the switch 90. The input side of the reproducing chroma processor 89 is connected to the output side of the BPF 76. A switch 120 has first and second fixed contacts, and a movable contact. The movable contact of the switch 120 is selectively connected to either the first fixed contact or the second fixed contact thereof. The output side of the reproducing chroma processor 89 leads to the first fixed contact of the switch 120. The movable contact of the switch 120 leads to a first input terminal of the video signal processing apparatus 200. The video signal processing apparatus 200 has a main output terminal and an auxiliary output terminal 201. The main output terminal of the video signal processing apparatus 200 is connected to a first input terminal of the adder 96.

The HPF 90A is successively followed by the FM demodulator 91, the deemphasis circuit 92, the LPF 93, and the noise processor 94. The output side of the noise processor 94 is connected to a second input terminal of the video signal processing apparatus 200. Also, the output side of the noise processor 94 is connected to an input side of the delay circuit 95. An output side of the delay circuit 95 is connected to a second input terminal of the adder 96. The output terminal of the adder 96 leads to a system output terminal 96A.

The auxiliary output terminal 201 of the video signal processing apparatus 200 is connected to a control terminal of the LPF 72, a control terminal of the HPF 75, a control terminal of the BPF 76, a control terminal of the LPF 79, a control terminal of the LPF 86, a control terminal of the HPF 90A, a control terminal of the LPF 93, and a control terminal of the delay circuit 95.

The video signal processing apparatus 200 is equal in structure to the video signal processing apparatus of FIG. 10. In the video signal processing apparatus 200, the output terminal of a voltage-to-current converter 16 leads to the auxiliary apparatus output terminal 201. An equalizer 11, a second-order LPF 14, and a subtractor 17 within the video signal processing circuit 200 are connected to the switch 120. A luminance edge signal generator 19 within the video signal processing apparatus 200 is connected to the noise processor 94. An adder 23 within the video signal processing apparatus 200 is connected to the adder 96.

Operation of the system of FIG. 25 can be changed between a recording mode and a playback mode. During the recording mode of operation, the switch 90 connects the BPF 76 to the AGC circuit 71 and disconnects the BPF 76 from the frequency up converter 88. In addition, the switch 120 disconnects the video signal processing apparatus 200 from the reproducing chroma processor 89. During the playback mode of operation, the switch 90 connects the BPF 76 to the frequency up converter 88 and disconnects the BPF 76 from the AGC circuit 71. In addition, the switch 120 connects the video signal processing apparatus 200 to the reproducing chroma processor 89.

Operation of the system of FIG. 25 will be explained in detail. During the recording mode of operation, a composite video signal is inputted into the AGC circuit 71 via the system input terminal 71A. The AGC circuit 71 removes a level variation from the composite video signal. The AGC circuit 71 outputs the resultant composite video signal to the LPF 72. Also, the AGC circuit 71 outputs the resultant composite video signal to the BPF 76 via the switch 90.

During the recording mode of operation, the LPF 72 separates a luminance signal from the composite video signal. The LPF 72 outputs the luminance signal to the emphasis circuit 73. The emphasis circuit 73 emphasizes high-frequency components of the luminance signal. The emphasis circuit 73 outputs the resultant luminance signal to the FM modulator 74. The FM modulator 74 implements frequency modulation responsive to the luminance signal, thereby converting the luminance signal into an FM luminance signal. The FM modulator 74 outputs the FM luminance signal to the HPF 75. The HPF 75 removes low-frequency components from the FM luminance signal. The HPF 75 outputs the resultant FM luminance signal to the adder 80.

During the recording mode of operation, the BPF 76 separates a color signal from the composite video signal. The BPF 76 outputs the color signal to the recording chroma processor 77. The recording chroma processor 77 removes a level variation from the color signal, and subjects the color signal to predetermined chroma processing. The recording chroma processor 77 outputs the resultant color signal to the frequency down converter 78. The frequency down converter 78 subjects the color signal to frequency down conversion, and thereby changes the color signal into a down-converted color signal. The frequency down converter 78 outputs the down-converted color signal to the LPF 79. The LPF 79 removes high-frequency components from the down-converted color signal. The LPF 79 outputs the resultant down-converted color signal to the adder 80.

The adder 80 multiplexes the FM luminance signal and the down-converted color signal into a composite signal on a frequency division basis. The adder 80 outputs the composite signal to the recording amplifier 81. The recording amplifier 81 enlarges the composite signal. The recording amplifier 81 outputs the resultant composite signal to the magnetic head 82. The magnetic head 82 records the composite signal on the magnetic tape 83.

During the recording mode of operation, a reference signal such as a color subcarrier is inputted into the video signal processing apparatus 200 via the switch 120. Specifically, the reference signal is applied to the equalizer 11 and the LPF 14 within the video signal processing apparatus 200. The output signal of the voltage-to-current converter 16 within the video signal processing apparatus 200 is fed via the auxiliary output terminal 201 to the LPF 72, the HPF 75, the BPF 76, and the LPF 79. Thus, the LPF 72, the HPF 75, the BPF 76, and the LPF 79 are automatically adjusted in response to the output signal of the voltage-to-current converter 16 within the video signal processing apparatus 200.

During the playback mode of operation, the magnetic head 84 scans the magnetic tape 83, and reproduces a composite signal therefrom. The magnetic head 84 outputs the reproduced signal to the reproducing amplifier 85. The reproducing amplifier 85 enlarges the reproduced signal. The reproducing amplifier 85 outputs the resultant reproduced signal to the LPF 86 and the HPF 90A.

During the playback mode of operation, the HPF 90A separates an FM luminance signal from the reproduced signal. The HPF 90A outputs the FM luminance signal to the FM demodulator 91. The FM demodulator 91 demodulates the FM luminance signal into a baseband luminance signal. The FM demodulator 91 outputs the baseband luminance signal to the deemphasis circuit 92. The deemphasis circuit 92 subjects the baseband luminance signal to a deemphasis process inverse with respect to the emphasis process provided by the emphasis circuit 73. The deemphasis circuit 92 outputs the resultant luminance signal to the LPF 93. The LPF 93 removes high-frequency components from the luminance signal. The LPF 93 outputs the resultant luminance signal to the noise processor 94. The noise processor 94 removes noise components from the luminance signal. The noise processor 94 outputs the resultant luminance signal to the delay circuit 95. Also, the noise processor 94 outputs the luminance signal to the video signal processing apparatus 200. Specifically, the noise processor 94 outputs the luminance signal to the luminance edge signal generator 19 within the video signal processing apparatus 200. The delay circuit 95 retards the luminance signal by an adjustable amount. The delay circuit 95 outputs the resultant luminance signal to the adder 96 as a reproduced luminance signal.

During the playback mode of operation, the LPF 86 separates a down-converted color signal from the reproduced signal. The LPF 86 outputs the down-converted color signal to the automatic color level adjuster 87. The automatic color level adjuster 87 removes a level variation from the down-converted color signal. The automatic color level adjuster 87 outputs the resultant down-converted color signal to the frequency up converter 88. The frequency up converter 88 subjects the down-converted color signal to frequency up conversion, and thereby changes the down-converted color signal into a reproduced color signal. The frequency up converter 88 outputs the reproduced color signal to the BPF 76 via the switch 90. The BPF 76 removes components from the reproduced color signal which have frequencies outside a predetermined band (a desired band). The BPF 76 outputs the resultant reproduced color signal to the reproducing chroma processor 89. The reproducing chroma processor 89 subjects the reproduced color signal to predetermined chroma processing. The reproducing chroma processor 89 outputs the resultant reproduced color signal to the video signal processing apparatus 200 via the switch 120. Specifically, the reproducing chroma processor 89 outputs the reproduced color signal to the equalizer 11, the LPF 14, and the subtractor 17 within the video signal processing apparatus 200.

During the playback mode of operation, the video signal processing apparatus 200 generates an edge-emphasized color signal (a quality-improved color signal) in response to the output signals of the reproducing chroma processor 89 and the noise processor 94. The edge-emphasized color signal appears at the output terminal of the adder 23 within the video signal processing apparatus 200. The video signal processing apparatus 200 outputs the edge-emphasized color signal to the adder 96 as a reproduced color signal. The adder 96 combines the reproduced luminance signal and the reproduced color signal into a reproduced composite video signal. The adder 96 feeds the reproduced composite video signal to the system output terminal 96A.

During the playback mode of operation, the output signal of the voltage-to-current converter 16 within the video signal processing apparatus 200 is fed via the auxiliary output terminal 201 to the LPF 86, the HPF 90A, the LPF 93, and the delay circuit 95. Thus, the LPF 86, the HPF 90A, the LPF 93, and the delay circuit 95 are automatically adjusted in response to the output signal of the voltage-to-current converter 16 within the video signal processing apparatus 200.

It should be noted that the video signal processing apparatus 200 may be replaced by the video signal processing apparatus of FIG. 12, the video signal processing apparatus of FIG. 13, the video signal processing apparatus of FIG. 15, the video signal processing apparatus of FIG. 16, the video signal processing apparatus of FIG. 17, the video signal processing apparatus of FIG. 18, the video signal processing apparatus of FIG. 19, the video signal processing apparatus of FIG. 21, the video signal processing apparatus of FIG. 22, the video signal processing apparatus of FIG. 23, or the video signal processing apparatus of FIG. 24.

What is claimed is:

1. A video signal processing apparatus comprising:
   an equalizer for delaying an input color signal by an adjustable phase retardation;
   a low pass filter for delaying the input color signal by an adjustable phase retardation;
   a phase detector for detecting a difference between a phase of an output signal of the equalizer and a phase of an output signal of the low pass filter, and outputting a signal representative of the detected phase difference; and
   means for adjusting the phase retardation provided by the equalizer and the phase retardation provided by the low pass filter in response to the output signal of the phase detector to maintain the difference between the phase of the output signal of the equalizer and the phase of the output signal of the low pass filter at a predetermined value.

2. A video signal processing apparatus as recited in claim 1, wherein the low pass filter comprises a second-order low pass filter, and the predetermined value is equal to 90 degrees.

3. A video signal processing apparatus as recited in claim 1, further comprising:
   an amplifier for amplifying the output signal of the equalizer at a variable gain, and outputting an amplification-resultant signal to the phase detector; and
   means for comparing a level of the input color signal and a level of the output signal of the amplifier, and varying the gain of the amplifier in response to a result of the level comparison to compensate for a level variation caused by the equalizer.

4. A video signal processing apparatus as recited in claim 1, further comprising:
   an adjustable filter; and
   means for adjusting the adjustable filter in response to the output signal of the phase detector.

5. A video signal processing apparatus as recited in claim 1, further comprising:
   means for generating a burst signal representative of a burst period; and
   means for selectively activating and deactivating the phase detector in response to the burst signal.

6. A video signal processing apparatus as recited in claim 1, further comprising:
   means for generating a vertical sync signal representative of a vertical sync period; and
   means for selectively activating and deactivating the phase detector in response to the vertical sync signal.

7. A video signal processing apparatus as recited in claim 1, further comprising:
   means for adding a reference signal to the input color signal on a time-division multiplexing basis; and
   means for activating the phase detector when the reference signal is present in the input color signal, and deactivating the phase detector when the reference signal is absent from the input color signal.

8. A video signal processing apparatus as recited in claim 7, further comprising means for removing a portion, corresponding to the reference signal, from the output signal of the equalizer.

9. A video signal processing apparatus as recited in claim 7, wherein the reference signal comprises a color subcarrier.

10. A video signal processing apparatus as recited in claim 1, wherein the adjusting means comprises:
- a first voltage-to-current converter for converting the output signal of the phase detector into a first current signal, the first voltage-to-current converter having a first conversion characteristic;
- a second voltage-to-current converter for converting the output signal of the phase detector into a second current signal, the second voltage-to-current converter having a second conversion characteristic different from the first conversion characteristic;
- a selector for selecting one out of the first current signal and the second current signal; and
- means for adjusting the phase retardation provided by the equalizer and the phase retardation provided by the low pass filter in response to the current signal selected by the selector.

11. A video signal processing apparatus comprising:
- a first equalizer for delaying an input color signal by an adjustable phase retardation;
- a second equalizer for delaying an output signal of the first equalizer by an adjustable phase retardation;
- a third equalizer for delaying an output signal of the second equalizer by an adjustable phase retardation;
- means for generating a first color edge signal in response to the input color signal and the output signal of the second equalizer;
- means for generating a second color edge signal in response to the output signal of the first equalizer and an output signal of the third equalizer;
- means for generating a luminance edge signal;
- a comparator for comparing the first color edge signal and the luminance edge signal;
- a multiplier for multiplying the second color edge signal and an output signal of the comparator;
- means for combining the output signal of the second equalizer and an output signal of the multiplier into an edge-emphasized color signal;
- a low pass filter for delaying the input color signal by an adjustable phase retardation;
- a phase detector for detecting a difference between a phase of an output signal of the low pass filter and one of (1) a phase of an output signal of the second equalizer and (2) a phase of an output signal of the third equalizer, and outputting a signal representative of the detected phase difference; and
- means for adjusting the phase retardation provided by the first equalizer, the phase retardation provided by the second equalizer, the phase retardation provided by the third equalizer, and the phase retardation provided by the low pass filter in response to the output signal of the phase detector.

12. A video signal processing apparatus as recited in claim 11, wherein the low pass filter comprises a second-order low pass filter.

13. A video signal processing apparatus as recited in claim 11, further comprising:
- means for compensating a level variation caused by the first equalizer;
- means for compensating a level variation caused by the second equalizer; and
- means for compensating a level variation caused by the third equalizer.

14. A video signal processing apparatus as recited in claim 11, further comprising:
- an adjustable filter; and
- means for adjusting the adjustable filter in response to the output signal of the phase detector.

15. A video signal processing apparatus as recited in claim 11, further comprising:
- means for generating a burst signal representative of a burst period; and
- means for selectively activating and deactivating the phase detector in response to the burst signal.

16. A video signal processing apparatus as recited in claim 11, further comprising:
- means for generating a vertical sync signal representative of a vertical sync period; and
- means for selectively activating and deactivating the phase detector in response to the vertical sync signal.

17. A video signal processing apparatus as recited in claim 11, further comprising:
- means for adding a reference signal to the input color signal on a time-division multiplexing basis; and
- means for activating the phase detector when the reference signal is present in the input color signal, and deactivating the phase detector when the reference signal is absent from the input color signal.

18. A video signal processing apparatus as recited in claim 17, further comprising means for removing a portion, corresponding to the reference signal, from the output signal of the second equalizer.

19. A video signal processing apparatus as recited in claim 17, wherein the reference signal comprises a color subcarrier.

20. A video signal processing apparatus as recited in claim 11, wherein the adjusting means comprises:
- a first voltage-to-current converter for converting the output signal of the phase detector into a first current signal, the first voltage-to-current converter having a first conversion characteristic;
- a second voltage-to-current converter for converting the output signal of the phase detector into a second current signal, the second voltage-to-current converter having a second conversion characteristic different from the first conversion characteristic;
- a selector for selecting one out of the first current signal and the second current signal; and
- means for adjusting the phase retardation provided by the first equalizer, the phase retardation provided by the second equalizer, the phase retardation provided by the third equalizer, and the phase retardation provided by the low pass filter in response to the current signal selected by the selector.

* * * * *